(12) United States Patent
Starr et al.

(10) Patent No.: US 9,888,807 B2
(45) Date of Patent: Feb. 13, 2018

(54) KITCHEN APPLIANCE FOR PREPARING A BEVERAGE AND METHOD OF OPERATING SAME

(71) Applicant: Hamilton Beach Brands, Inc., Glen Allen, VA (US)

(72) Inventors: William D Starr, Richmond, VA (US); Patrick T Mulvaney, Richmond, VA (US); Adam Hanes, Glen Allen, VA (US); Larry Olson, Montpelier, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 59 days.

(21) Appl. No.: 15/096,904

(22) Filed: Apr. 12, 2016

(65) Prior Publication Data

US 2016/0220063 A1    Aug. 4, 2016

Related U.S. Application Data

(60) Division of application No. 13/949,394, filed on Jul. 24, 2013, now Pat. No. 9,332,876, which is a
(Continued)

(51) Int. Cl.
*A47J 31/00* (2006.01)
*A47J 31/56* (2006.01)
(Continued)

(52) U.S. Cl.
CPC ........... *A47J 31/56* (2013.01); *A47J 31/0573* (2013.01); *A47J 31/0576* (2013.01); *A47J 31/34* (2013.01);
(Continued)

(58) Field of Classification Search
CPC ..... A47J 31/04; A47J 31/0573; A47J 31/0576
(Continued)

(56) References Cited

U.S. PATENT DOCUMENTS 3,260,190 A      7/1966  Levinson
4,143,589 A  *   3/1979  Weber ................... A47J 31/057
                                                        99/282
(Continued)

FOREIGN PATENT DOCUMENTS

CN      101091621      12/2007
CN      101342053       1/2009
(Continued)

OTHER PUBLICATIONS

Office Action in CN201310073410.4.

*Primary Examiner* — Reginald L Alexander
(74) *Attorney, Agent, or Firm* — Alexander D. Raring

(57) ABSTRACT

A kitchen appliance includes a first reservoir for receiving a liquid to be used for preparing a beverage. A hot water generator ('HWG') has an inlet end, an outlet end and a passageway extending therebetween. The inlet end of the HWG is connected to the first reservoir. Liquid from the first reservoir flows into the HWG through the inlet end. A second reservoir is connected to the outlet end of the HWG. The second reservoir includes a discharge port, a gas vent and a skirt extending from a wall of the second reservoir further than the gas vent. The skirt at least partially surrounds the gas vent. At least a portion of the skirt is spaced laterally inwardly from an outer sidewall of the second reservoir.

8 Claims, 23 Drawing Sheets

Related U.S. Application Data continuation-in-part of application No. 13/863,937, filed on Apr. 16, 2013, now abandoned, which is a continuation-in-part of application No. 13/754,158, filed on Jan. 30, 2013.

(51) Int. Cl.
  *A47J 31/46* (2006.01)
  *A47J 31/54* (2006.01)
  *A47J 31/34* (2006.01)
  *A47J 31/057* (2006.01)

(52) U.S. Cl.
  CPC ............ *A47J 31/462* (2013.01); *A47J 31/465* (2013.01); *A47J 31/54* (2013.01); *A47J 31/542* (2013.01)

(58) Field of Classification Search
  USPC ............... 99/307, 302 R; 219/490, 492, 494; 392/465, 471
  See application file for complete search history.

(56) References Cited

U.S. PATENT DOCUMENTS

| | | | |
|---|---|---|---|
| 4,815,366 A * | 3/1989 | Hauslein | A47J 31/465 99/283 |
| 5,111,740 A | 5/1992 | Klein | |
| 5,197,374 A | 3/1993 | Fond | |
| 5,242,702 A | 9/1993 | Fond | |
| 5,325,765 A | 7/1994 | Sylvan et al. | |
| 5,460,078 A | 10/1995 | Weller et al. | |
| 5,490,448 A | 2/1996 | Weller et al. | |
| D381,237 S | 7/1997 | De'Longhi | |
| D382,437 S | 8/1997 | Amiel | |
| 6,079,315 A | 6/2000 | Beaulium et al. | |
| 6,142,063 A * | 11/2000 | Beaulieu | A47J 31/32 99/283 |
| 6,182,554 B1 | 2/2001 | Beaulium et al. | |
| 6,499,388 B2 | 12/2002 | Schmed | |
| 6,536,332 B2 | 3/2003 | Schmed | |
| 6,606,938 B2 | 8/2003 | Taylor | |
| 6,708,600 B2 | 3/2004 | Winkler et al. | |
| 7,097,074 B2 | 8/2006 | Halliday et al. | |
| 7,347,138 B2 | 3/2008 | Bragg et al. | |
| 7,398,726 B2 * | 7/2008 | Streeter | A47J 31/32 99/280 |
| 7,469,628 B2 | 12/2008 | Mandralis et al. | |
| 7,513,192 B2 | 4/2009 | Sullivan et al. | |
| 7,856,920 B2 | 12/2010 | Schmed et al. | |
| D635,813 S | 4/2011 | Moore et al. | |
| 2013/0108249 A1 * | 5/2013 | Krause | B67D 3/0022 392/465 |

FOREIGN PATENT DOCUMENTS

| | | |
|---|---|---|
| CN | 102362782 | 2/2012 |
| DE | 2932053 | 2/1981 |

\* cited by examiner

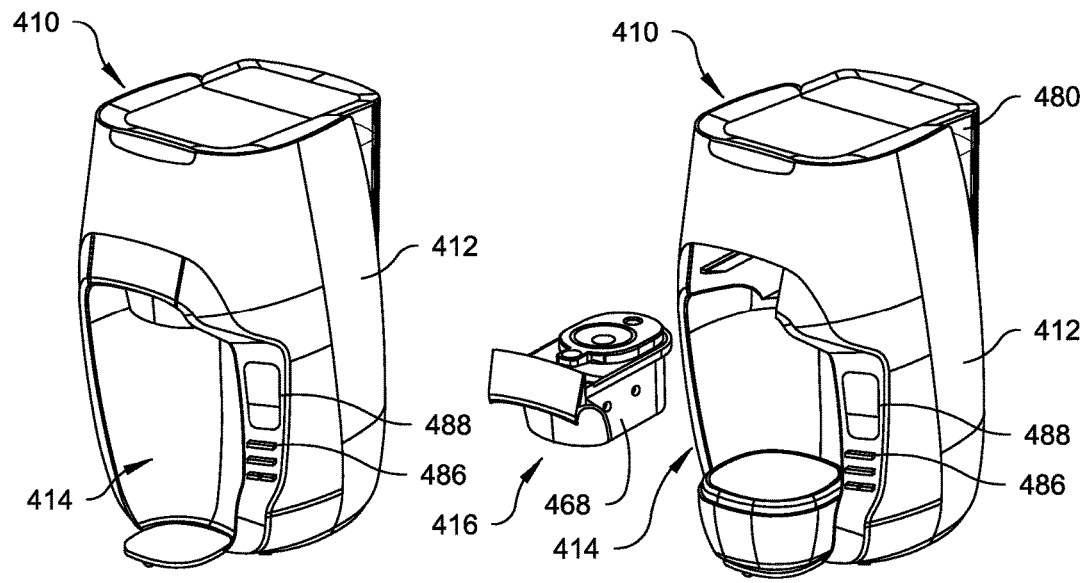
Fig. 10
Fig. 11
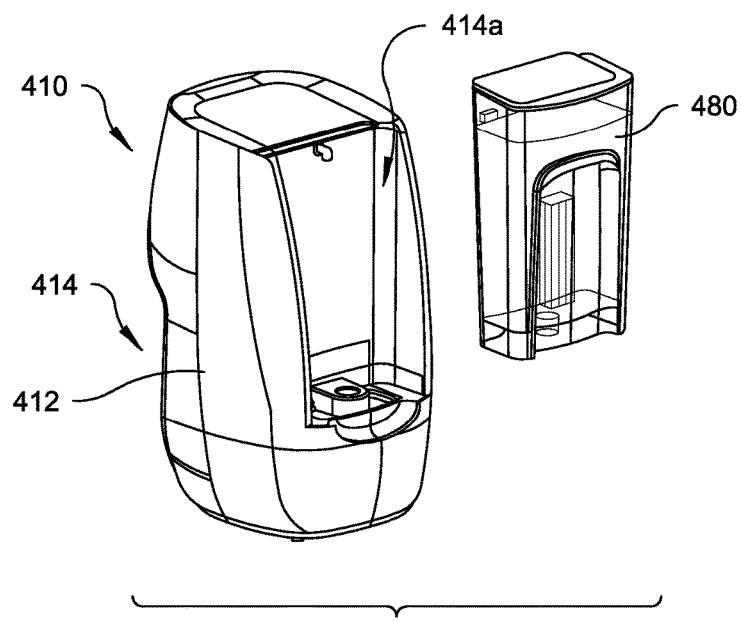
Fig. 12 ary kitchen appliance for preparing beverage. The subject kitchen appliance can be operated as a pressurized brewing system or as an automatic drip brewing system that operates at ambient pressure depending upon the position of a valve within the kitchen appliance.

KITCHEN APPLIANCE FOR PREPARING A BEVERAGE AND METHOD OF OPERATING SAME

CROSS-REFERENCE TO RELATED APPLICATIONS

The present application is a divisional application of U.S. patent application Ser. No. 13/949,394, which is a Continuation-In-Part (CIP) application of U.S. patent application Ser. No. 13/863,937, filed Apr. 16, 2013, which is a CIP application of U.S. patent application Ser. No. 13/754,158, filed Jan. 30, 2013 and titled "Kitchen Appliance for Preparing a Beverage and Method of Operating Same."

SUMMARY OF THE DISCLOSURE

The present disclosure relates generally to a kitchen appliance for preparing beverage. The subject kitchen appliance can be operated as a pressurized brewing system or as an automatic drip brewing system that operates at ambient pressure depending upon the position of a valve within the kitchen appliance.

BACKGROUND OF THE DISCLOSURE

Kitchen appliances for preparing a beverage are well known. However, conventional devices have numerous disadvantages. For example, conventional devices generally use a pressurized system (such as espresso, cartridge brewers, etc.) that employ mechanical air or liquid pumps or an unpressurized/ambient system (e.g., percolators, automatic drip coffeemakers, etc.). It is not known to operate a machine in both pressurized (closed) and ambient (open) conditions during different brew or heating cycles. In addition, known pressurized systems can be loud due to the use of mechanical liquid or air pumps. Mechanical liquid and air pumps are also relatively expensive components that effect manufacturing costs and the complexity and reliability of the appliance. Finally, liquid and air pumps may push water through an infusible material too quickly. The strength of a brewed beverage can be increased by a longer contact time between the fluid to be infused and the infusible material. While a mechanical pump can quickly produce a brewed beverage, the beverage may be relatively weak or less desirable than a "slower" brew system.

It has heretofore not been discovered how to create a kitchen appliance that is capable of preparing beverages under both pressure and ambient conditions during different brew cycles. Further, there is a need for a pressurized brewing system that uses low cost and/or reliable components that does not employ a mechanical liquid or air pump to motivate the fluid that is to be infused. The device of the following disclosure accomplishes the above and other objectives and overcomes at least the above-described disadvantages of conventional kitchen appliances.

BRIEF SUMMARY OF THE DISCLOSURE

Briefly stated, one aspect of the present disclosure is directed to a kitchen appliance including a first reservoir for receiving a liquid to be used for preparing a beverage. A hot water generator ("HWG") has an inlet end, an outlet end and a passageway extending therebetween. The inlet end of the HWG is connected to the first reservoir. Liquid from the first reservoir flows into the HWG through the inlet end. A second reservoir is connected to the outlet end of the HWG. The second reservoir includes a discharge port, a gas vent and a skirt extending from a wall of the second reservoir further than the gas vent. At least a portion of the skirt is spaced laterally inwardly from an outer sidewall of the second reservoir.

Another aspect of the present disclosure is directed to a kitchen appliance including a first reservoir for receiving a liquid to be used for preparing a beverage. A HWG has an inlet end, an outlet end and a passageway extending therebetween. The inlet end of the HWG is connected to the first reservoir. Liquid from the first reservoir flows into the HWG through the inlet end. A second reservoir is connected to the outlet end of the HWG. The second reservoir includes a discharge port. A third reservoir is connected to the first reservoir. Liquid within the third reservoir is maintained at atmospheric pressure. A primary check valve is positioned between the first reservoir and the third reservoir. The primary check valve prevents liquid in the first reservoir from entering the third reservoir from the first reservoir. A pressure release valve is positioned in at least one of or between the first reservoir and the third reservoir. The pressure release valve is moveable between an open position to permit the flow of fluid therethrough and a closed position to prevent the flow of fluid therethrough. The pressure release valve is biased to the closed position.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 10 is a top front perspective view of the kitchen appliance according to another embodiment of the subject appliance;

FIG. 11 is another top front perspective view thereof, wherein a drawer is shown fully separated from a housing;

FIG. 12 is a top rear perspective view of the kitchen appliance thereof; wherein a reservoir is shown fully separated from the housing;

DETAILED DESCRIPTION OF THE DISCLOSURE

Figure 1:
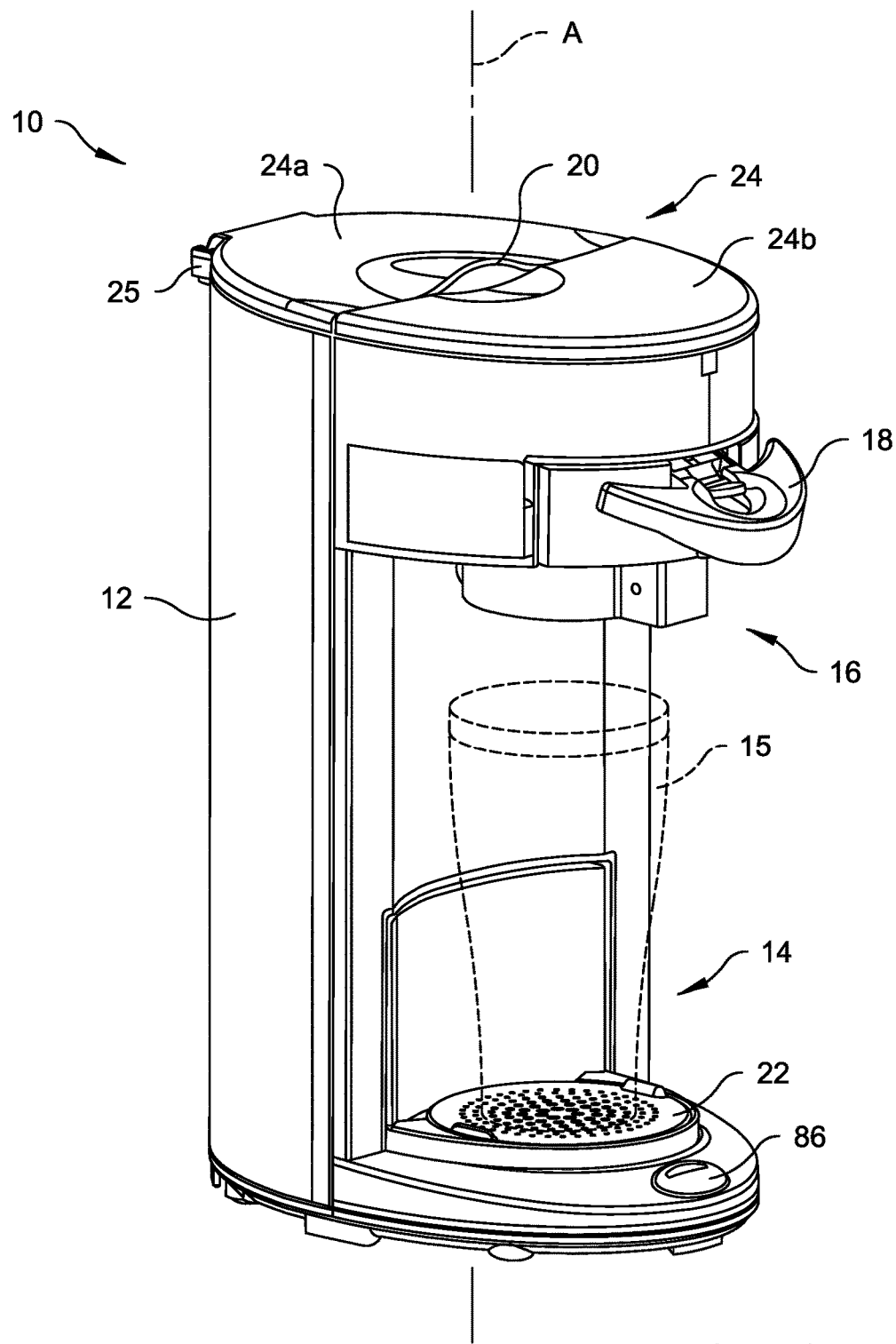
FIG. 1 is a perspective view of a kitchen appliance according to one embodiment of the present disclosure.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 2A:
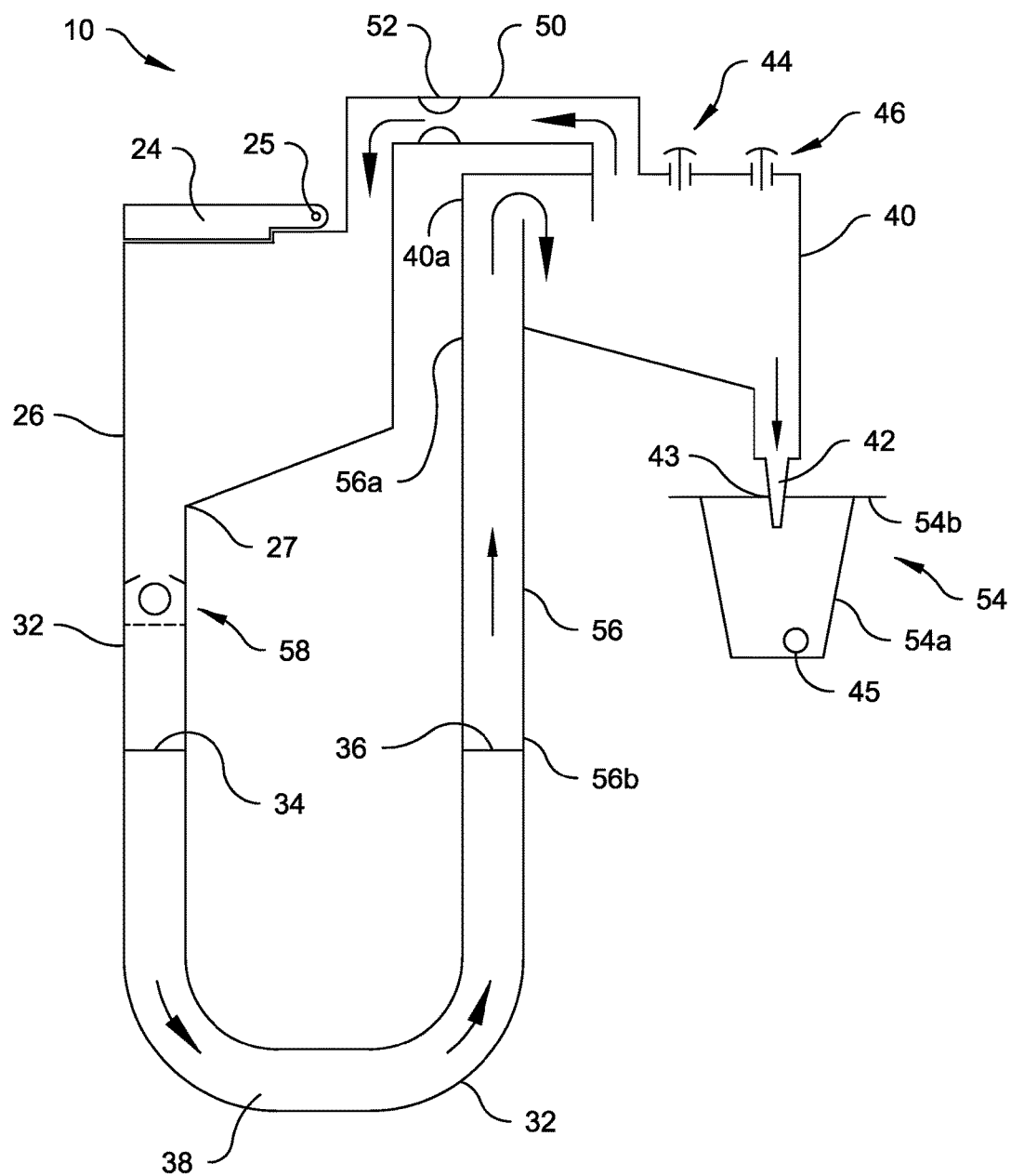
FIG. 2A is a schematic diagram of certain components thereof.

Referring to the drawings in detail, wherein like numerals indicate like elements throughout, FIGS. 1 and 2A illustrate a kitchen appliance, generally designated 10, in accordance with a preferred embodiment of the present disclosure. The kitchen appliance 10 is intended or designed for preparing a beverage from foodstuff (none shown) to be consumed by a user. The present disclosure is not limited by the type of beverage prepared by the kitchen appliance 10 of foodstuff used to prepare the beverage. For example, the term "foodstuff," as used herein, is sufficiently broad to cover any extractible/infusible substance, such as coffee grounds, tea leaves, hot chocolate powder, soup ingredients, oatmeal and the like.

Thus, the kitchen appliance 10 is versatile because it may be used to create and/or prepare any one of a variety of different types of beverages from a variety of different types of foodstuff. More specifically, the kitchen appliance 10 preferably heats liquid, such as water, to a sufficient temperature to be combined with or poured over the foodstuff to create a hot beverage. The term "beverage" is broadly defined herein as hot water or a combination of liquid and foodstuff.

The kitchen appliance 10 is versatile because it preferably allows a user to create a beverage from foodstuff in any one of a variety of different forms or states. For example, the kitchen appliance 10 may be used to make coffee or tea from loose coffee grounds or leaves, coffee grounds or leaves contained in a generally soft packet (i.e., a flexible coffee "pod" or a tea bag), or coffee grounds or tea leaves contained in a generally hard container (i.e., a rigid coffee or tea "pod"). The foodstuff is preferably inserted into at least a portion of the kitchen appliance 10 in a dry or generally dry state. Following completion of preparation of the beverage, any moist or saturated foodstuff remaining in the kitchen appliance 10 is preferably removed and either recycled or discarded.

The kitchen appliance 10 is also versatile because it is preferably capable of operating in either of at least two operating modes, such as a non-pressurized (i.e., drip brew) mode and a pressurized mode. In the non-pressurized mode, the kitchen appliance 10 operates similar to a conventional automatic drip coffee maker ("ADC"). For example, in the non-pressurized mode, an internal pressure of the kitchen appliance 10 is generally maintained at or near atmospheric pressure (i.e., 1 atm=101.325 kPa=14.696 psi). In the pressurized mode, an internal pressure of the kitchen appliance 10 is raised to greater than ambient pressure during a brew or heat cycle, as explained further below.

Referring to FIG. 1, the kitchen appliance 10 includes an outer housing 12 for enclosing and protecting internal components of the kitchen appliance 10, as described in detail below. A longitudinal axis A of the housing 12 extends at least generally, and preferably exactly, perpendicularly to a support surface, such as a tabletop or countertop (none shown), when the kitchen appliance 10 is placed on the support surface. The housing 12 and/or any components thereof may be constructed from any polymer, metal or other suitable material. For example, an injection molded acrylonitrile butadiene styrene (ABS) material could be employed, but the housing may be constructed of nearly any generally rigid material that is able to take on the general shape of the housing 12 and perform the functionality of the housing 12 described herein. The housing 12 may be generally or completely opaque, translucent or transparent.

The housing 12 preferably includes a recess 14 that is preferably sized, shaped and/or configured to receive and/or support at least a portion of cup, pot, travel mug or other vessel 15 (shown in phantom in FIG. 1) for receiving a beverage or liquid that exits the kitchen appliance 10. The beverage preferably flows, drips or otherwise accumulates in the vessel 15, and the vessel 15 is removed from the recess 14 prior to consumption of the beverage by the user. A drawer 16 is preferably removably attachable to the housing 12 and positioned directly above the recess 14 when properly attached to the housing 12. In a fully-inserted position (see FIG. 1), at least an outer peripheral portion of the drawer 16 rests on a ledge (not shown) in an interior of the housing 12 and/or in the recess 14. The drawer 16 preferably slides laterally along the ledge when the drawer 16 is inserted into and/or removed from the housing 12. The drawer 16 preferably includes a handle 18 that extends outwardly beyond at least a portion of the housing 12. The drawer 16 preferably holds the foodstuff used to prepare the beverage, and is described in more detail below, and may include a filter (not shown) therein. A drip tray or grate 22 may be positioned proximate a lower end of the recess 14 to receive any excess beverage or liquid is not received in the vessel 15. Grate 22 acts as a cup support and may be repositioned to adjust for the size of the vessel 15. For instance, grate 22 can be positioned to act as a shelf (not shown) so that a mug would be positioned closer to the drawer 16. In a second position, grate 22 can accommodate a taller travel vessel.

As shown in FIG. 1, an on/off button 86 is preferably exposed on the housing 12. The kitchen appliance 10 of the present embodiment prepares a beverage of a single-serving size (which is up to approximately 16 ounces of prepared beverage), although it is envisioned that the embodiments disclosed herein could be operative with larger serving sizes as well. Depressing the on/off button 86 preferably begins an operating cycle, and subsequent depressing the on/off button 86 preferably ends an operating cycle. The phrase "operating cycle" is broadly defined herein as a period of time when the kitchen appliance 10 is first activated to when the beverage is fully prepared and the kitchen appliance 10 is deactivated. The kitchen appliance 10 performs both pressurized and un-pressurized brewing cycles. For each pressurized operating cycle, there can be a plurality of pressure/vacuum cycles, as described in detail below, which preferably act to increase an average pressure of fluid within the kitchen appliance 10 to prepare the beverage. The kitchen appliance 10 may automatically turn off or deactivate once the operating cycle is complete, as described below. The kitchen appliance 10 is not limited to including a single on/off button 86. For example, additional buttons, knobs, switches and/or levers (none shown) could be added to the kitchen appliance 10 to allow the user increased control over the functionality and/or operation of the kitchen appliance 10. For example, the kitchen appliance 10 may include a button that allows the user to select between a pressurized mode and a non-pressurized mode or a flow selector to select between a single serve function and a multi-serve function.

Referring again to FIG. 1, a cover 24 is preferably removably positioned or attached to an upper end of the housing 12. The cover 24 preferably encloses an interior cavity of the housing 12 and permits access thereto. At least a portion of the cover 24 is preferably movable between a first, upward or removed position (not shown) for allowing liquid to be inserted into at least a portion of the housing 12, and a second, downward or attached position (see FIGS. 1 and 2A) for closing and/or sealing the internal cavity of the housing 12. In a properly closed position (see FIG. 1), the cover 24 may seal the interior cavity of the housing 12 to create a fluid-tight connection. Alternatively, the closed cover 24 may not be "air-tight," such that it permits gas to enter into at least a portion of the interior cavity of the housing 12. A second portion, which is designated as 24b in FIG. 1, may be fixed and enclose other parts of appliance 10.

To insert liquid into the appropriate portion of the housing 12 to commence an operating cycle, an openable portion of the cover (designated as 24a in FIG. 1) or the entire cover (designated as 24 in FIG. 2A) is temporarily removed or pivoted to an open position with respect to the housing 12 to expose at least a portion of the interior cavity thereof. The cover 24 or cover portion 24a may be attached to at least a portion of the housing 12 by a hinge 25. Alternatively, the cover 24 or cover portion 24a may be snap-fitted or friction-fitted onto a least a portion of the upper end of the housing 12.

Referring to FIG. 2A, the kitchen appliance 10 preferably includes at least one first reservoir 26 for receiving and/or holding liquid to be used for preparing a beverage. The term "reservoir" is broadly defined herein throughout as a body, cavity, or conduit that holds a volume of liquid, either temporarily or for an extended period of time. The first reservoir 26 may be referred to as a cold water pressure reservoir, although the kitchen appliance 10 can operate in both pressurized or unpressurized states depending on whether an outlet to the appliance is restricted. The arrows shown in FIG. 2A indicate the direction of flow of fluid (e.g., water and/or steam) within the kitchen appliance 10 in a pressurized mode. It is preferred that the first reservoir 26 is completely surrounded by and/or positioned completely within the housing 12 when the cover 24 is attached to the housing 12 in a closed position. The first reservoir 26 is preferably sized, shaped and/or configured to receive at least an amount of liquid that is suitable for preparing a consumer-selected amount of the beverage, such as six, eight or twelve ounces or any other single-serving size. Alternatively, the first reservoir 26 may be sufficiently sized to receive an amount of liquid that is capable of filling an entire pot of approximately one liter, for example. An outlet 27 is formed in a lower portion of the first reservoir 26, and at least a portion of a bottom wall of the first reservoir 26 may be slanted or sloped to direct liquid within the first reservoir 26 toward the outlet 27.

To begin an operating cycle of the kitchen appliance, liquid is preferably inserted into and/or contained within the first reservoir 26. A user may manually pour liquid directly into the first reservoir 26, or liquid may be inserted into the first reservoir 26 automatically, such as by activation of a switch or button (none shown) by the user. When the cover 24 is open, such as during insertion of liquid into the first reservoir 26, a pressure within the first reservoir 26 is preferably at atmospheric pressure. However, as described in more detail below, during operation of the kitchen appliance 10 in the pressurized mode (namely, with an outlet to appliance 10 restricted), the cover 24 is preferably in a closed and sealed position (see FIGS. 1 and 2A) and, as described below, the first reservoir 26 is preferably capable of maintaining an internal pressure that is greater than atmospheric pressure. Alternatively or additionally, the first reservoir 26 may include a separate lid (not shown) that allows the first reservoir 26 to be selectively sealed and unsealed despite the positioning of the cover 24. In such an embodiment, the lid may include at least some of the same features and/or functionality of the cover 24 as described above.

Referring again to FIG. 2A, the kitchen appliance 10 preferably includes at least one HWG 32. The HWG 32 is preferably capable of heating liquid therein to at least a temperature sufficient to create a phase change of at least some of the liquid into gas. Such a phase change creates or generates the force(s) necessary to move fluid throughout the kitchen appliance 10 to prepare a beverage. The HWG 32 is preferably a generally U-shaped, tubular, aluminum extrusion, HWG with a cal-rod. Such a device is a generally inexpensive means to heat and motivate liquid in a non-mechanical manner (i.e., no impellers, air pump, or the like) and can be found in an ADC. The HWG 32 preferably includes an inlet end 34 (i.e., upstream side), an opposing outlet end 36 (i.e., downstream side) and a passageway 38 therebetween. The inlet end 34 of the HWG 32 is fluidly connected to at least a portion of the first reservoir 26 for receiving liquid therefrom. The phrase "fluidly connected" is broadly defined herein as being in fluid communication, in addition to being "adjacent to" by direct or indirect attachment.

Once the first reservoir 26 is at least partially filled, the fluid level in the kitchen appliance 10 equalizes between the upstream and downstream portions (relevant to the HWG 32), as further described below. Liquid from the first reservoir 26 preferably flows from the outlet 27 into the HWG 32 through the inlet end 34 thereof. The HWG 32 is a gravity-fed device, in which liquid enters the HWG 32 due to the force of gravity. Thus, at least a portion of the first reservoir 26 is preferably positioned at a level or height that is higher than the HWG 32 to provide positive head pressure to fill the HWG 32 with liquid from the first reservoir 26. HWG 32 could be a boiler or a continuous flow-through heater, although for the purposes of space, cost, complexity, reliability, and the like, it is preferred that the HWG 32 is not a boiler or a continuous flow-through heater. It is also preferred that the HWG 32 is the driving force or catalyst for preparing the beverage. In other words, there is no impeller, positive displacement pump, water pump, air pump, or the like used to motivate fluid through the HWG 32 to an outlet. Once at equilibrium in the kitchen appliance 10, fluid motivation during a brew or heat cycle occurs solely due to a phase change of the fluid that occurs in the HWG 32 during operation.

The kitchen appliance 10 preferably includes at least one second reservoir 40 preferably fluidly connected to the outlet end 36 of the HWG 32. As before and throughout, "reservoir" is defined herein as a body, cavity, or conduit that holds a volume of liquid, either temporarily or for an extended period of time. The second reservoir 40 may be referred to as a hot water reservoir or a "showerhead." The second reservoir 40 transmits or holds a volume of hot liquid to be infused into the foodstuff for preparing a beverage, as described in detail below. The second reservoir 40 is preferably laterally adjacent to and/or laterally spaced-apart from the first reservoir 26. In one embodiment, the outlet end 36 of the HWG 32 is preferably fluidly connected to an inlet portion 40a of the second reservoir 40. While the second reservoir 40 could be a tube, a riser tube 56 may be positioned between and may connect the outlet end 36 of the HWG 32 to the inlet portion 40a of the second reservoir 40. A first or upper end 56a of the riser tube 56 is preferably positioned at a level or height which is higher than the outlet 27 and a maximum fill line of the first reservoir 26, and a second or lower end 56b of the riser tube 56 is preferably positioned at a level or height which is lower than the outlet 27 of the first reservoir 26.

Referring to FIG. 2A, the kitchen appliance 10 preferably includes an inlet check valve 58 positioned between the first reservoir 26 and the HWG 32. The inlet check valve 58 prevents liquid to flow from the HWG 32 in the downstream direction. In other words, fluid in the HWG 32 should not enter the first reservoir 26 at the outlet 27 end of the first reservoir 26. More specifically, the inlet check valve 58 is a one-way valve positioned proximate to or within the inlet end 34 of the HWG 32 and/or the outlet 27 of the first reservoir 26. The inlet check valve 58 and any other check valves described herein may be any type of one-way valve, such as a silicone flapper, a ball-type valve, a diaphragm-type valve, a duckbill valve, an in-line valve, a stop-check valve, a lift-check valve or the like.

As briefly noted above, when liquid is poured into or is present in the first reservoir 26 and the HWG 32 is not activated or energized (e.g., pulsed), liquid travels into the HWG 32 and at least partially into the riser tube 56 until an equilibrium level of the liquid is achieved. In some embodiments, such as where the second reservoir 40 is a tube directly connected to an outlet and HWG 32, the liquid would partially enter second reservoir 40. In other words, the height of liquid proximate the inlet end 34 of the HWG 32 is generally equal to the height of liquid proximate the outlet end 36 of the HWG 32. Shortly after the HWG 32 is activated or energized, a temperature of at least the liquid in the HWG 32 begins to rise. Eventually, the liquid begins to boil and experiences or exhibits a phase change from liquid to gas, which increases pressure within the HWG 32. A level or height of a top of the first reservoir 26 could be lower than a level or height of an entry point to the second reservoir 40 so that liquid will not flow into the second reservoir 40 prior to activation of the HWG 32.

Pressure created from the gas attempts to push liquid out of the HWG 32. Due to the inlet check valve 58 preventing liquid within the HWG 32 from entering the first reservoir 26, the riser tube 56 and/or the second reservoir 40 offers the least resistance to the rising liquid. Therefore, the pressure pushes at least some liquid out of the HWG 32 through the outlet end 36, upwardly through the riser tube 56 and/or second reservoir 40. In an unpressurized mode, the heated fluid exits the kitchen appliance 10 to interact with an infusible material. During operation in the pressurized mode (i.e., the appliance outlet is restricted such that the HWG 32 generates a greater flow than can be accommodated), internal pressure is equalized between the first and second reservoirs 26, 40 (described further below) so that there is roughly equal pressure on the upstream side and downstream sides of the HWG 32. Actuation or pulsing of the HWG 32 continues and/or repeats until all or substantially all of the liquid in the system is displaced from the first reservoir 26, as described below.

In one embodiment, a discharge port 42 is preferably formed in and extends at least slightly outwardly from a lower portion of the second reservoir 40. The discharge port 42 may include one or more relatively small or narrow internal passageway(s). In the unpressurized mode, the discharge port 42 is open to ambient pressure and, therefore, pressure buildup in appliance 10 is able to escape through discharge port 42 relatively easily so that the system is maintained substantially at ambient conditions. At least a portion of a bottom wall of the second reservoir 40 could be slanted or sloped to direct liquid toward the discharge port 42. A lower tip of the discharge port 42 can be sharp or pointed. Liquid may exit the discharge port 42 at an angle with respect to a longitudinal axis of the discharge port 42, which is preferably generally, if not exactly, parallel to the longitudinal axis A of the housing 12. In particular, liquid may exit the discharge port 42 at an angle between approximately thirty and ninety degrees (30°-90°) with respect to the longitudinal axis A of the housing 12. However, liquid may exit the discharge port 42 in a manner that is parallel to the longitudinal axis A of the housing 12. Other geometric arrangements would also be suitable. In another embodiment, outlet port 42 may resemble a more conventional showerhead of an ADC for use with loose infusible material.

Referring again to FIG. 2A, a fluid path preferably fluidly connects the second reservoir 40 to the first reservoir 26 so as to bypass the HWG 32. This arrangement forms a looped system for fluid flow. The fluid path could be a conduit 50. First reservoir 26 could also be a conduit so that the fluid path from the second reservoir to the first reservoir is the opening at the juncture of first and second reservoirs. In the embodiment where first reservoir 26 is a holding tank of sorts and conduit 50 serves as the fluid path to loop the second reservoir to the first reservoir, at least a portion of the conduit 50 can be at a level or height that is higher than an upper or top portion of both the first and second reservoirs 26, 40. The conduit 50 may include a uniform interior diameter, or the conduit 50 may include a portion 52 (referred to herein as "reduction 52") having a reduced cross-sectional area to reduce the amount of fluid (liquid or steam) flowing through the conduit 50. The reduction 52 may extend inwardly into an interior passageway of the conduit 50, or the reduction 52 may simply be a relatively small opening at an upper or top portion of the second reservoir 40. The reduction 52 can be used to allow the second reservoir 40 to dissipate pressure to the first reservoir 26 at a slower rate than presented by the HWG which can impact the flow rate through the discharge port 42. In other words, the reduction 52 could optionally be used to retard the timing of a pressure wave movement through the kitchen appliance 10. Reduction 52 could provide an adjustability to further restrict or release pressure traveling from the second reservoir to the first reservoir. An adjustable reduction 52 might automatically or manually vary the amount of restriction based on temperature, flow, pressure, or user preferences.

In the pressurized mode of operation, the kitchen appliance 10 includes or works in combination with a container 54 that at least partially encloses the foodstuff used to prepare the beverage. The container 54 may include a generally rigid body 54a and a cap or foil top 54b removable therefrom. The container 54 may be a conventional K-CUP®, a rigid pod, or any other structure that is capable of holding or storing foodstuff. The container 54 is preferably removably insertable into the drawer 16. When the container 54 is properly inserted into the drawer 16 and the drawer 16 is properly attached to the housing 12, an interior of the container 54 is preferably fluidly connected to the discharge port 42 of the second reservoir 40. More specifically, the discharge port 42 may be at least partially inserted into the container 54, such that a tip or distal end of the discharge port 42 pierces or is otherwise inserted into the cap 54b of the container 54. The container restricts the flow through the discharge port 42 in a manner that causes appliance 10 to operate in a pressurized mode.

Prior to being inserted into the housing 12, the container 54 may be air-tight such that the foodstuff therein is completely surrounded by the body 54a and the cap 54b. However, once the container 54 is properly inserted into the drawer 16 and the drawer 16 is properly inserted into the housing 12, at least two spaced-apart holes are preferably formed or present in the container 54. A first hole 43 exists by or at the discharge port 42 piercing or being inserted into the cap 54b. Thus the first hole 43 is preferably formed in an upper end of the container 54. The first hole 43 can be formed by moving the container 54 with respect to the generally stationary discharge port 42. However, the first hole 43 may be formed by moving the discharge port 42 with respect to the container 54, which may be held stationary. A width or diameter of the first hole 43 is preferably approximately the same as that of the discharge port 42 to provide a tight fit between the first hole 43 and the discharge port 42. A second hole 45 is present or formed in the body 54a, as described in detail below. The second hole 35 is preferably formed or located in or near a lower end of the container 54 and vertically below a foodstuff within the container 54. The second hole 45 can be formed during and/or after the container 54 is properly inserted into the drawer 16. Nevertheless, the foodstuff in the container 54 acts as a restriction on the discharge port 42.

The presence of the restriction at the outlet means the appliance operates in a pressurized mode. Namely, when the container 54 is present as a restriction on the discharge port 42, the first reservoir 26, the HWG 32, the second reservoir 40, the fluid path/conduit 50 and the container 54 preferably form at least a generally closed system. At least a portion of the HWG 32, such as a portion of the passageway 38, is preferably the lowest portion of the system. At least a portion of the conduit 50 or first reservoir 26 can be the highest portion of the system.

With the discharge port 42 at least partially restricted, the system is configured to achieve and maintain an internal pressure that is greater than atmospheric pressure. In particular, upon activating or energizing the HWG 32, a temperature of at least a portion of the liquid within the system begins to increase. This, in turn, increases the internal pressure within the system. In other words, with a constant capacity volume, increasing the temperature of the system increases the pressure of the system. The discharge port 42, although at least partially restricted at ambient pressures, is the path of least resistance and only outlet path. The aforementioned phase change in the HWG effectuates movement of liquid in the HWG 32 (under pressure) to the second reservoir 40, through the discharge port 42 and into the container 54 to prepare a beverage.

As the HWG 32 continues to heat and move fluid from the passageway 38 of the HWG 32 into the second reservoir 40, heated fluid under pressure is directed toward and into the discharge port 42. The heated fluid preferably flows under pressure through the discharge port 42 and into the container 54 to contact the foodstuff therein. At the initial wetting of the foodstuff within the container 54, a flow restriction through the container 54 is relatively low. However, as the foodstuff within the container 54 becomes increasingly saturated, the flow restriction of the foodstuff increases and slows the flow of liquid through the discharge port 42. As a result, the flow rate through the container 54 is less than the HWG 32 initially supplies. Pressure within the appliance 10, including second reservoir 40, increases further.

When a pressure level within the second reservoir 40 begins to increase, at least some of the fluid (i.e., liquid or steam) travels back to the first reservoir 26 via a fluid path such as an opening between the two reservoirs or the conduit 50. Thus, any pressure differential between the second reservoir 40 and the first reservoir 26 is reduced or equalized. Pressure equalization within the first and second reservoirs 26, 40 occurs by circulating or "recycling" fluid back to the beginning of the system. The average pressure within the entire system is increased.

When the first and second reservoirs 26, 40 are maintained at a generally equal internal pressure, liquid within the first reservoir 26 is able to flow through the inlet check valve 58 and into the HWG 32. In some embodiments of the kitchen appliance 10, fluid entering the HWG 32 is at a higher temperature than the liquid that originally entered the HWG 32 at the beginning of the operating cycle due to the "recycling" of the fluid. As such, the fluid is converted to gas more quickly in the HWG 32. This can increase the flow rate to the second reservoir 40. This cycle of pressure increase and fluid flow is continued within the system and eventually forces substantially all fluid under pressure through the container 54 and into the vessel 15. Although the first and second reservoirs 26, 40 are preferably maintained at approximately the same internal pressure throughout the pressurized mode, the internal pressure is preferably higher than ambient pressure and acts as a motivating force to move heated liquid in the second reservoir 40 through/over the restriction of the foodstuff in the container 54 and into the vessel 15. Without pressure equalization between the first and second reservoirs 26, 40, as would be absent in a conventional ADC, the inlet check valve 58 would fail to open until HWG 32 "boils dry" and deactivates or pressure on the upstream side of HWG 32 is otherwise dissipated. A failure to refill the HWG 32 during a brew cycle is known as "stalling" the brew or heat cycle. Backpressure, as created by the container 54, would stall a conventional ADC. ADC stalling is explained further below.

As shown in FIG. 2A, a pressure relief valve 44 and/or a separate vacuum release valve 46 may be positioned in or near a top wall of the second reservoir 40. The valves 44, 46 may be of a spring-loaded, umbrella type, or the like. The pressure relief valve 44 is preferably biased closed and preferably opens when a pressure within the second reservoir 40 reaches a predetermined value. The pressure relief valve 44 can prevent over-pressurization of the discharge port 42. The vacuum release valve 46 is preferably biased closed and preferably opens if and when a vacuum is created inside the second reservoir 40 or when the internal pressure drops below atmospheric, as described in detail below. A discharge check valve (not shown, but see discharge check valve 266 described below and shown in FIG. 3) may be positioned in the second reservoir 40 proximate the discharge port 42.

During normal pulsing caused by the HWG 32, heated fluid is displaced from the closed system (e.g., through the container 54 and into the vessel 15), which creates a void that generates a negative pressure. A vacuum may be created within the second reservoir 40 when gas therein begins to cool or is otherwise converted to liquid. The negative pressure or vacuum can be relieved through the discharge port 42 and/or the vacuum release valve 46. It is important to prevent negative pressure from reaching the discharge port 42 because negative pressure may pull foodstuff from the container 54 upwardly into the second reservoir 40 through the discharge port 42. The vacuum release valve 46 is preferably closed when a pressure within the second reservoir 40 is positive (i.e., equal to or greater than atmospheric). The vacuum release valve 46 may be positioned wherever gas condenses most easily and/or often. For example, the vacuum release valve 46 may be positioned near the HWG 32 where gas is initially created, or near the discharge port 42 wherein the vacuum is undesirable.

In operation, liquid is preferably initially introduced into the first reservoir 26, and flows into the HWG 32 and possibly into a portion of the riser tube 56 due to gravity. Liquid preferably stops flowing when equilibrium is reached, such that a height of liquid in the first reservoir 26 is at least generally if not exactly equal to a height of liquid in the riser tube 56 and/or a downstream side of the HWG 32. After the HWG 32 is activated, at least some liquid within the system preferably is heated and transformed into gas. Gas and liquid eventually flow into the second reservoir 40. Liquid continues to flow through the discharge port 42 and into the container 54. At a certain point of saturation of the foodstuff in the container 54, fluid within the second reservoir 40 may flow through to the first reservoir 26 while bypassing the HWG 32, thereby creating a loop to recycle fluid. The resulting pressure equalization pushes more liquid from the first reservoir 26 into the HWG 32 or otherwise equalizes pressure so that inlet check valve 58 can open. Thus, fluid within the system travels in a generally circular path until the end of an operating cycle at which point any back-pressure caused by the saturated foodstuff is overcome by the increased pressure within the system. Eventually, a combination of fluid and foodstuff in the container 54 flows into the vessel 15 for consumption by the user. Once the desired amount of a combination of liquid infused by the foodstuff flows into the vessel 15, the HWG 32 is preferably automatically deactivated (e.g., shuts-off) and the operating cycle is complete.

In a conventional ADC the internal pressure is not equalized on the upstream and downstream sides of the HWG 32. Even relatively low back-pressure on the downstream fluid path from the HWG can cause the HWG to stall, as noted above. During a "stall" of the HWG, pressure in the HWG exceeds the pressure upstream of an inlet check valve such that the check valve opening is delayed. The delay causes the HWG to become hotter than desired. When the pressure is finally dispelled and liquid beings to flow into the HWG, the liquid therein flashes into gas. The increased pressure associated with the burst of gas prematurely closes the inlet check valve before the liquid properly fills the HWG. This slow cycle will repeat until all of the liquid is largely vaporized out of the system. The container of the subject disclosure causes a backpressure that would stall an ADC. It is the novel configuration of the subject kitchen appliance 10 that permits backpressure without stalling the HWG 32.

A preferred method of operating the kitchen appliance 10 in the pressurized mode to prepare a beverage includes placing a container 54 within the drawer 16 and properly attaching and/or inserting the drawer 16 into the housing 12. Container 54 may include a top hole or a first hole 43 is created in the container 54 when the discharge port 42 pierces the cap 54a and extends into the container 54. A second hole 45 may exist or is created in the body 54b of the container 54 preferably when the container 54 is inserted into at least a portion of the drawer 16. A flow path is thereby created through the container 54 from the first hole 43 to the second hole 45. The first reservoir 26 is at least partially filled with liquid, which then flows into the HWG 32. When the HWG 32 is activated, an internal pressure of the system and a temperature of the liquid is increased. Eventually, gas is produced which moves heated liquid under pressure into and through the second reservoir 40 to the discharge port 42 and into the container 54. As fluid (i.e., liquid and gas) enters the second reservoir 40, a labyrinth path (not shown) may be used to separate the liquid and gas. As the foodstuff within the container 54 becomes saturated, a back-pressure is increased in the second reservoir 40. The back-pressure is overcome by continuing to operate the HWG 32 such that the internal pressure of the system is increased to a level above the back-pressure. At this point, hot liquid is forced under pressure through the container 54 and into the vessel 15 to be consumed by the user.

Figure 2B:
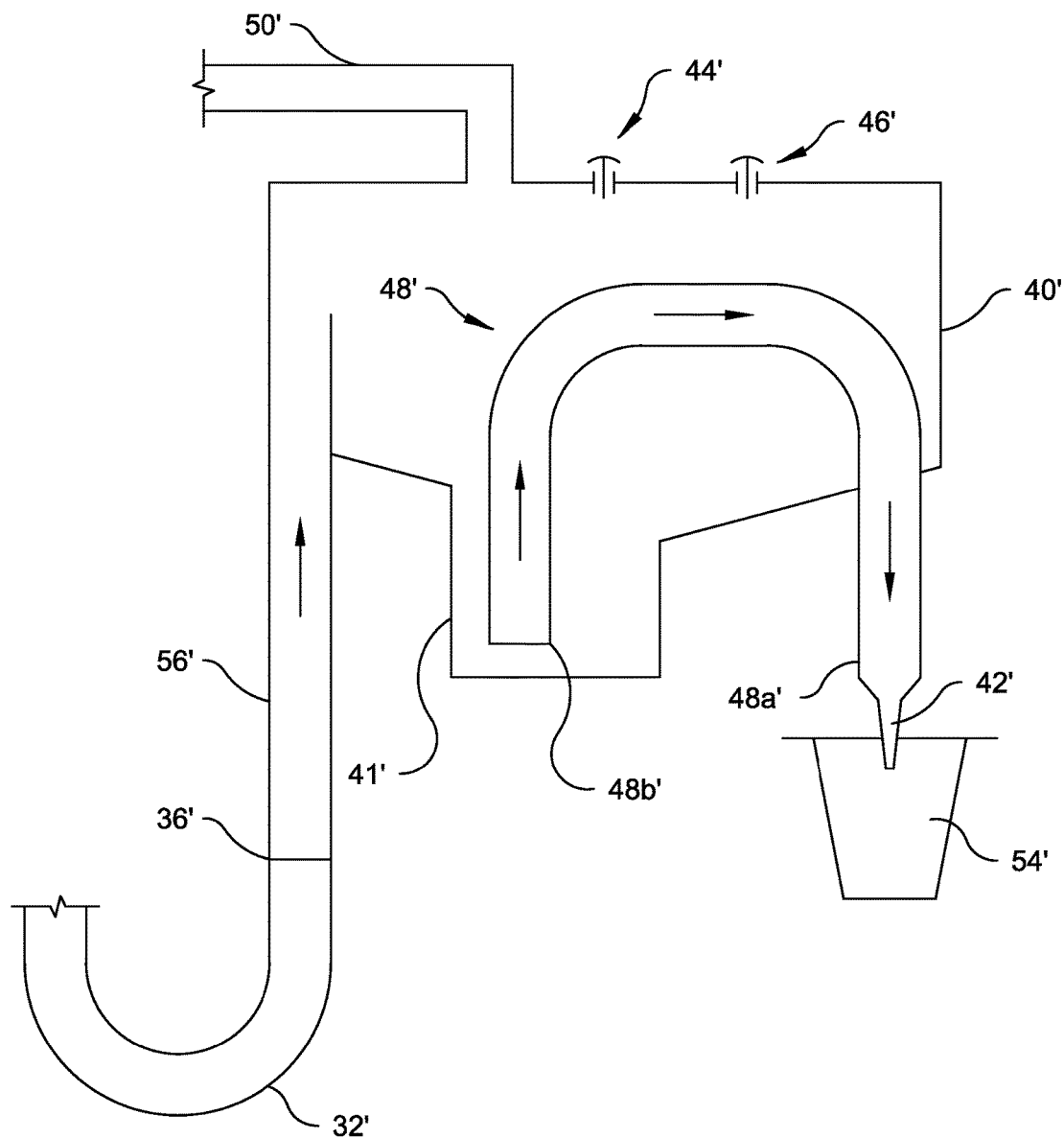
FIG. 2B is a schematic diagram of certain portions of the kitchen appliance according to an embodiment of the present disclosure.

FIG. 2B illustrates a modified embodiment of the second reservoir 40' of the present disclosure. The reference numerals of the modified embodiment are distinguishable from those of the previously-described embodiment by a prime symbol ('), but otherwise indicate the same elements as indicated in the first embodiment, except as otherwise specified. While certain like reference numerals may be shown in FIG. 2B, the description of certain similarities between the embodiments may be omitted herein for the sake of brevity and convenience, and, therefore, is not limiting.

The modified embodiment of the second reservoir 40' includes an additional portion or extension 41' that preferably extends downwardly below the bottom wall of the second reservoir 40'. The extension 41' allows the second reservoir 40' to hold or otherwise store and increased amount of liquid without increasing the height of the housing 12. However, if the discharge port 42' is not properly positioned (or if the discharge port 42' cannot be properly positioned because of other design constrains), liquid within the extension 41' may pool therein without moving toward the discharge port 42' to eventually exit the system.

Near the end of an operating cycle, the HWG 32' may struggle to motivate heated liquid into the second reservoir 40'. As a result, the HWG 32' will generate additional gas (i.e., steam). The gas generation at the end of an operating cycle can be greater than the pressure relief valve 44' can evacuate. If it is, the second reservoir 40' is further pressurized for a relatively short amount of time. During the short duration, the extra pressure will push any heated liquid within the second reservoir 40' above the discharge port 42' through the container 54'. Further, the steam moving through the container 54' pushes liquid out of the container 54' so that dripping from the container 54' after a brew cycle can be minimized.

To accelerate liquid evacuation from the second reservoir 40' and/or remove pooling liquid from within the extension 41', a sump tube 48' may be positioned therein to allow heated liquid to move from a lower portion of the extension 41' of the second reservoir 40' through the discharge port 42'. In particular, it is preferred that the sump tube 48' ensures that the second reservoir 40' empties any heated liquid therein between operating cycles and/or at the end of any operating cycle. The sump tube 48' may be a silicone tube and preferably includes a first or inlet end 48a' and a second or outlet end 48b'. The outlet end 48b' of the sump tube 48' can be fluidly connected to the discharge port 42'. The pressure in the second reservoir 40' at the end of an operating cycle pushes the fluid up and through the sump tube 48'.

Figure 3:
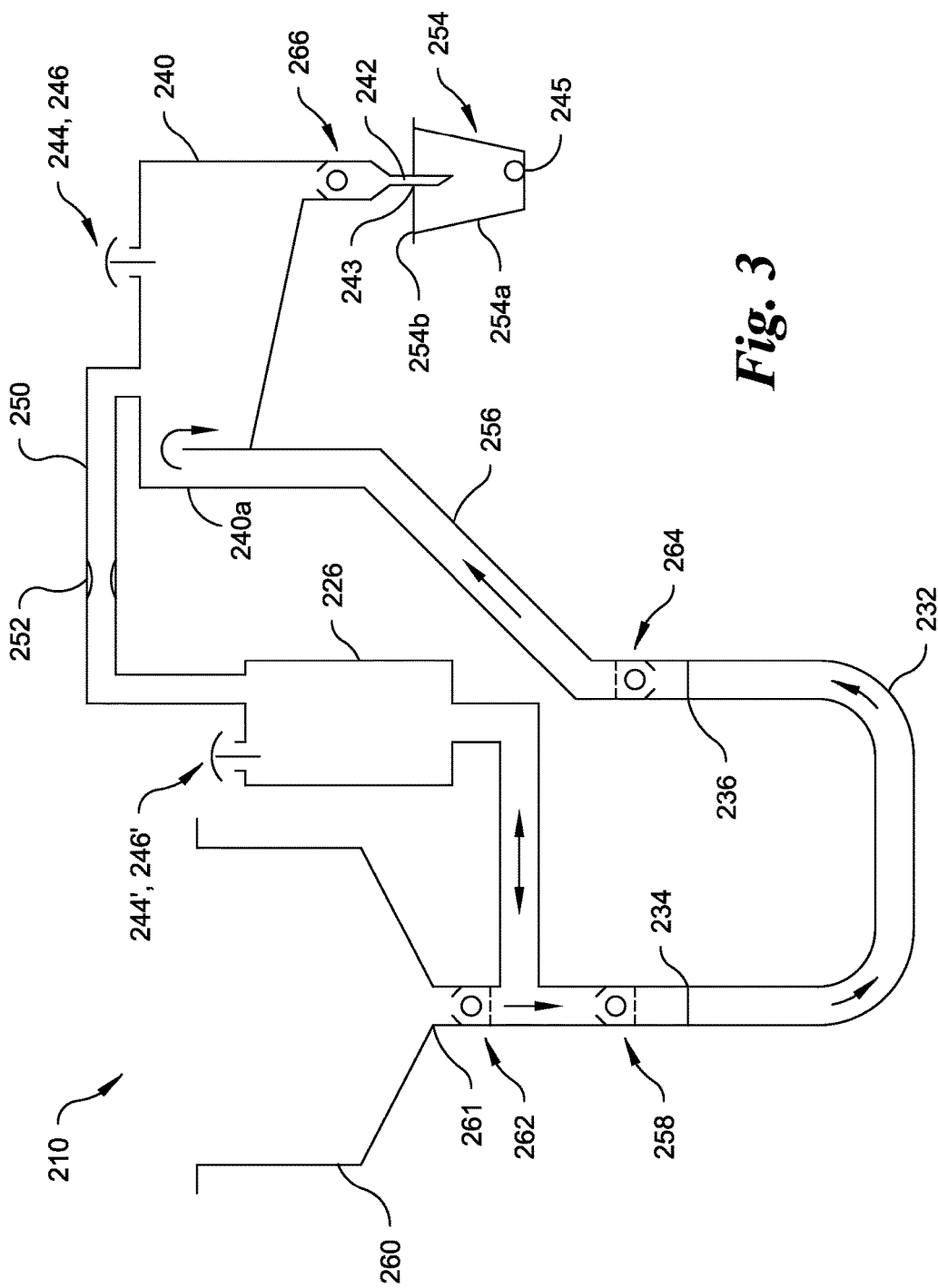
FIG. 3 is a schematic diagram of certain components of the kitchen appliance according to another embodiment of the present disclosure.

FIG. 3 illustrates another preferred embodiment of the kitchen appliance 210. The reference numerals of the present embodiment are distinguishable from those of the earlier embodiment by a factor of two-hundred (200), but otherwise indicate the same elements as indicated above, except as otherwise specified. The kitchen appliance 210 of the present embodiment is substantially similar to that of the earlier embodiment. While certain like reference numerals may be shown in FIG. 3, the description of certain similarities between the embodiments may be omitted herein for the sake of brevity and convenience, and, therefore, is not limiting.

A distinguishing feature of the present embodiment is the inclusion of one or more additional reservoirs fluidly connected to the first reservoir 226. For instance, a third reservoir 260 could include an outlet 261 formed in a lower portion of thereof, and at least a portion of a bottom wall of the third reservoir 260 may be slanted or sloped to direct liquid toward the outlet 261. A filter (not shown) may be positioned proximate the outlet 261. An upper end of the third reservoir 260 may be open and/or the cover (not shown) of the housing (not shown) is preferably not air-tight in the closed position, such that the third reservoir 260 is maintained at atmospheric pressure at all times (e.g., during a pressurized brew or heat cycle). The outlet 261 of the third reservoir 260 is preferably fluidly connected to the first reservoir 226.

In the present embodiment, at least a portion of the third reservoir 260 is at a similar vertical height as the first reservoir 226, while at least another portion of the first reservoir 226 is positioned at a height that is vertically below the third reservoir 260. More specifically, a main body of the first reservoir 226 is preferably laterally off-set from the third reservoir 260, such that a water level in both the main body of the first reservoir 226 and the third reservoir 260 can be generally equal. However, a lower portion of the first reservoir 226 may be piping or tubing that extends at a level which is lower than the third reservoir 260 and fluidly connects the third reservoir 260 with the HWG 232 and the main body of the first reservoir 226. For example, the lower portion may be a T-connection that fluidly connects the third reservoir 260 with the HWG 232 and the main body of the first reservoir 226.

Fluid within the first and second reservoirs 226, 240 is preferably not able to enter the third reservoir 260. In particular, a primary check valve 262 is preferably positioned between the first reservoir 226 and the third reservoir 260. The primary check valve 262 is preferably positioned within one leg of the T-connection, but may be positioned in another portion of the first reservoir 226 or in a portion of the third reservoir 260. The primary check valve 262 is a one-way valve that prevents fluid in the first reservoir 226 and the HWG 232 from entering the third reservoir 260, but allows fluid to flow freely from the third reservoir 260 into HWG 232 and/or the first reservoir 226. The primary check valve 262 also preferably prevents pressure from being released from the system and into the third reservoir 260. The primary check valve 262 is open when liquid within the third reservoir 260 is drawn or drained into the HWG 232 and/or the first reservoir 226. The primary check valve 262 is closed when the HWG 232 and/or the first reservoir 226 is sufficiently filled with liquid and/or a pressure within the system is greater than a pressure within the third reservoir 260. A second pressure relief valve 244' and/or a second vacuum release valve 246' may be formed in the first reservoir 226 to selectively reduce a pressure load and relieve a vacuum, respectively, as described in detail above.

An optional outlet check valve 264 is preferably positioned in or between the HWG 232 and the second reservoir 240. The outlet check valve 264 is a one-way valve and prevents liquid in the second reservoir 240 from entering the HWG 232. The outlet check valve 264 is preferably open when the HWG 232 is pumping heated liquid into the riser tube 256 and/or the second reservoir 240. The outlet check valve 264 is preferably closed when heated liquid is not being forced out of the HWG 232 and/or when a pressure within the second reservoir 240 is greater than a pressure within the HWG 232. In other words, the outlet check valve 264 prevents a vacuum created by the eventual phase change of gas (e.g., steam) to liquid (e.g., water) in the HWG 232 from drawing liquid in the riser tube 256 back into the HWG 232.

A discharge check valve 266 is preferably positioned in the second reservoir 240 proximate the discharge port 242. The discharge check valve 266 is a one-way valve and prevents liquid and/or foodstuff in the container 254 from entering the second reservoir 240. The discharge check valve 266 is preferably open when liquid is flowing from the second reservoir 240 into the container 254 and/or when a pressure within the second reservoir 240 is greater than a pressure within the container 254. The discharge check valve 266 is preferably closed when a pressure within the second reservoir 240 is less than a pressure within the container 254, such as when the container 254 creates a relatively high back-pressure (i.e., a vacuum). The reduction 252 facilitates the first reservoir 226 in holding a vacuum after the HWG 232 has begun another pulse, which allows the first reservoir 226 to fill from the third reservoir 260 as efficiently as possible.

In operation with a container restricting the discharge port, the second reservoir 240 fills with hot liquid, and then the conduit 250 will fill with hot liquid and/or gas. When liquid reaches the reduction 252, a larger pressure differential between the second reservoir 240 and the first reservoir 226 is created than during normal operation. This larger pressure differential causes the inlet check valve 258, which may be positioned within the T-connection of the first reservoir 226, to remain closed and cause a stalled condition of the HWG 232. As a result, the HWG 232 generates greater volumes of gas and increases the internal pressure of the second reservoir 240. The higher pressure in the second reservoir 240 overcomes the load of the restricted container 254 and empties the conduit 250. The pressure differential then equalizes between the second reservoir 240 and the first reservoir 226, which allows water to enter the HWG 232. Since the pressure changes in the first reservoir 226 lags or trails the pressure in the second reservoir 240, the first reservoir 226 will be at a higher pressure and force more liquid into the HWG 232, which will act to terminate any stall event and return the kitchen appliance 210 to normal pumping operation.

FIGS. 4-9D illustrates another embodiment of the kitchen appliance 310. The reference numerals of the present embodiment are distinguishable from those of the earlier embodiment by a factor of three-hundred (300), but otherwise indicate the same elements as indicated in the previous embodiments, except as otherwise specified. The kitchen appliance 310 of the present embodiment is substantially similar to that of the earlier embodiments. While certain like reference numerals may be shown in FIGS. 4-9D, the description of certain similarities between the embodiments may be omitted herein for the sake of brevity and convenience, and, therefore, is not limiting.

Figure 4:
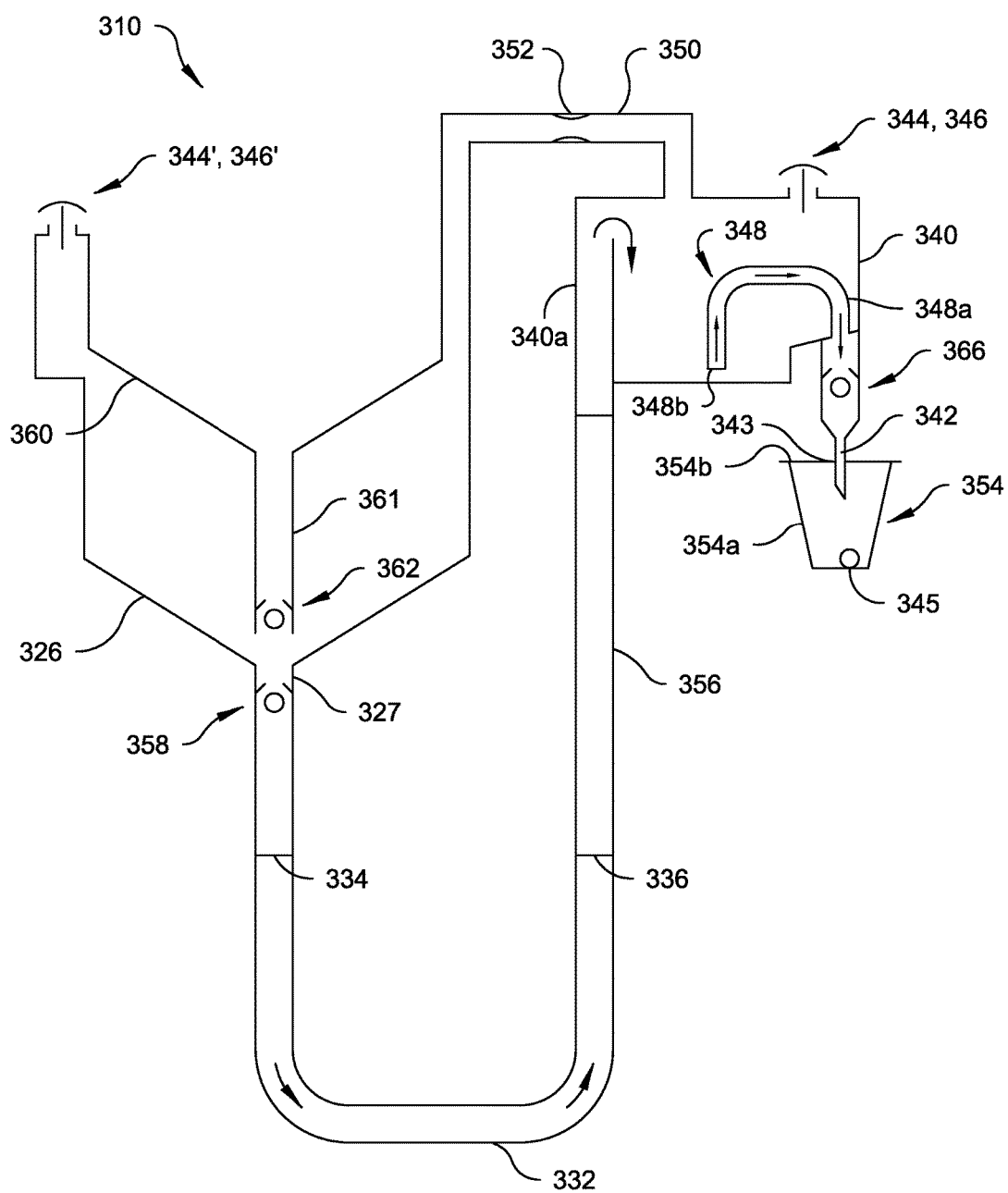
FIG. 4 is a schematic diagram of certain components of the kitchen appliance according to one embodiment of the present disclosure.
Figure 5:
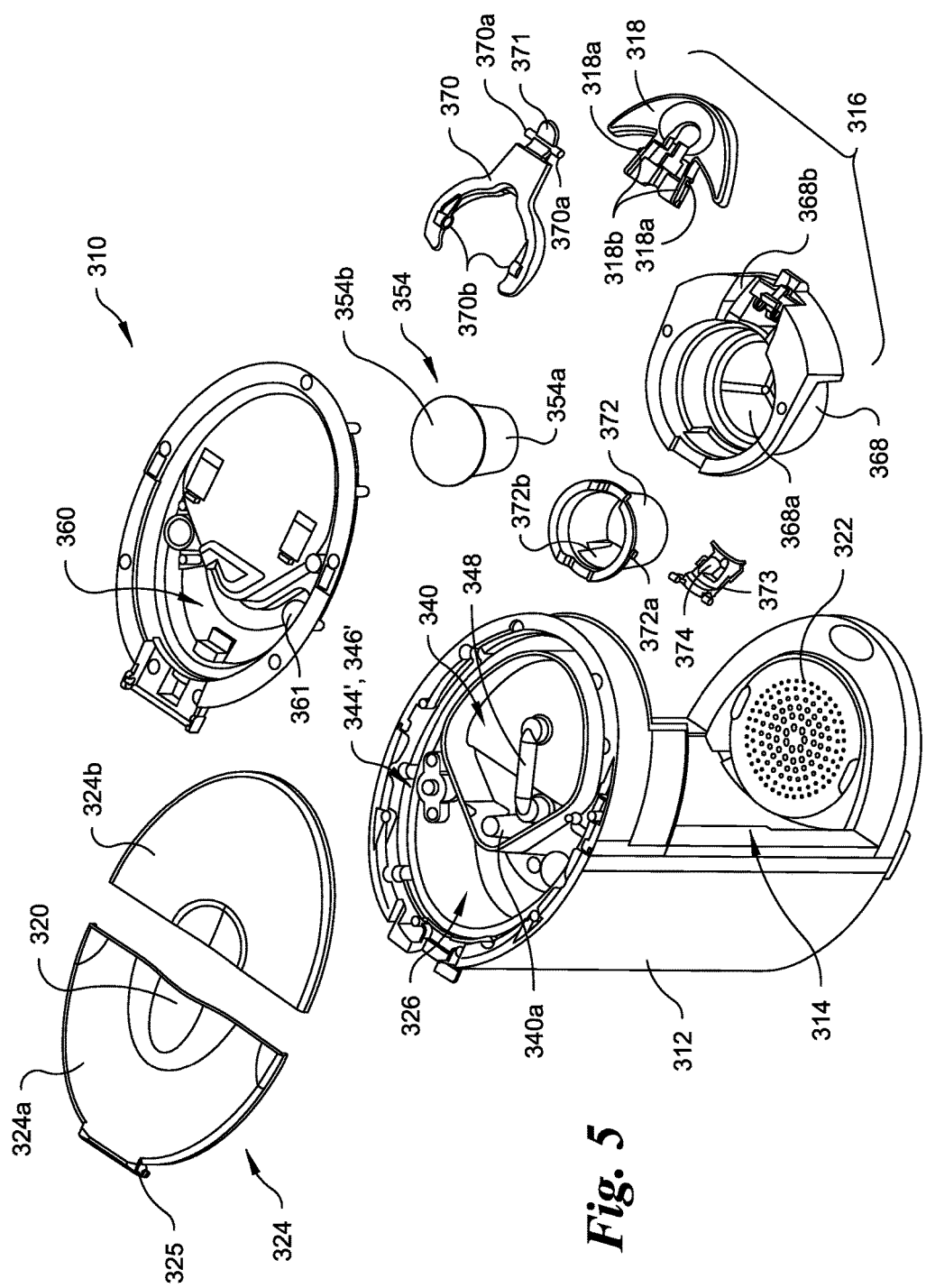
FIG. 5 is a partially exploded perspective view thereof.

Referring to FIGS. 4 and 5, the third reservoir 360 is preferably positioned directly above and/or partially within the first reservoir 326. Similar to the previous embodiment, the third reservoir 360 is preferably maintained at atmospheric pressure. Thus, even in the pressurized mode, a lid 324a permits air to pass into the third reservoir 360 when in a closed position. Lid 324a and top housing 324b form the top surfaces 324 of housing 312. When lid 324a is in an open position, an interior of the third reservoir 360 is preferably exposed to the external environment.

Figure 6:
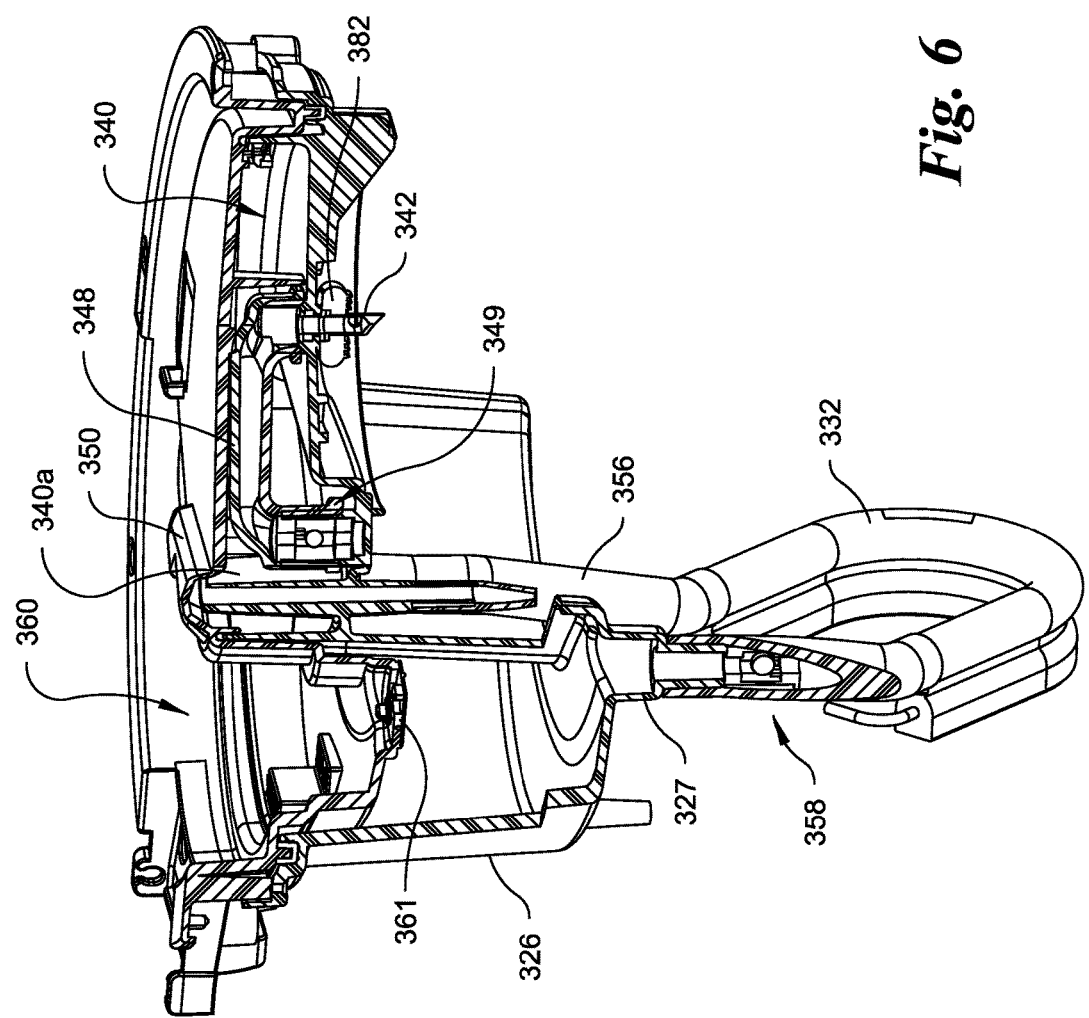
FIG. 6 is a partial cross-sectional perspective view of certain components thereof.

As shown in FIG. 6, a sump tube 348 preferably includes an discharge check valve 349 therein. The discharge check valve 349 preferably prevents liquid from flowing from sump tube 348 back into second reservoir 340. In particular, the discharge check valve 349 is preferably opened when an internal pressure within the second reservoir 340 is sufficient to push fluid through sump tube 348. The discharge check valve 349 is preferably closed when the internal pressure within the second reservoir 340 is relatively low and/or insufficient to motivate fluid through sump tube 348. The kitchen appliance 310 is not limited to the inclusion of the discharge check valve 349, which may be omitted.

Referring to FIGS. 5 and 7-9D, the drawer 316 of the kitchen appliance 310 preferably includes a basket 368 having a filter 368a in a bottom wall thereof. The basket 368 may receive foodstuff therein, such as loose coffee grounds, a soft "pod" or a tea bag, for example. To prepare a beverage without using the container 354 (i.e., to run a non-pressurized brew or heat cycle), liquid from the discharge port 342 may flow over and/or through the foodstuff placed directly into the basket 368, through the filter 368a and into the vessel (not shown) for consumption by the user.

To prepare a beverage using a container 354 or otherwise operate the kitchen appliance 310 in the pressurized mode, a combination of a support fork 370, a cartridge holder 372, the basket 368 and the handle 318 are preferably used. As shown in FIGS. 7-9D, the cartridge holder 372 is preferably sized, shaped and/or configured to receive the container 354 therein. The cartridge holder 372 is preferably at least slightly larger than the container 354, such that the cartridge holder 372 generally surrounds the entire container 354 when the container 354 is properly placed therein. The basket 368 is preferably sized, shaped and/or configured to receive the cartridge holder 372. The basket 368 is preferably at least slightly larger than the cartridge holder 372, such that the basket 368 generally surrounds the entire cartridge holder 372 when the cartridge holder 372 is properly placed therein.

Figure 7:
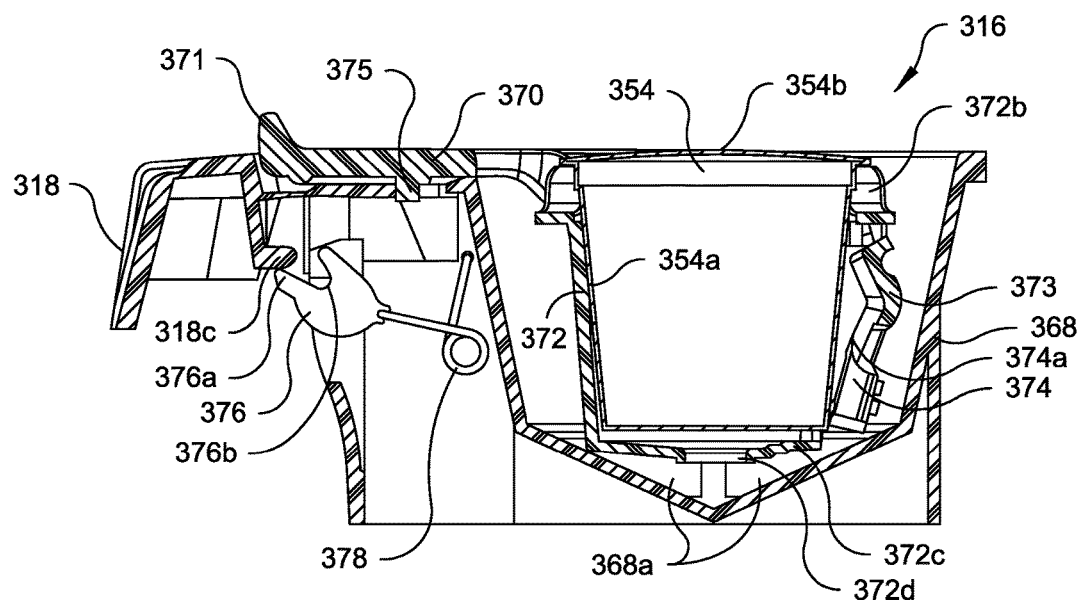
FIG. 7 is a cross-sectional side elevational view of certain components thereof, wherein a handle is shown in a horizontal position.
Figure 8:
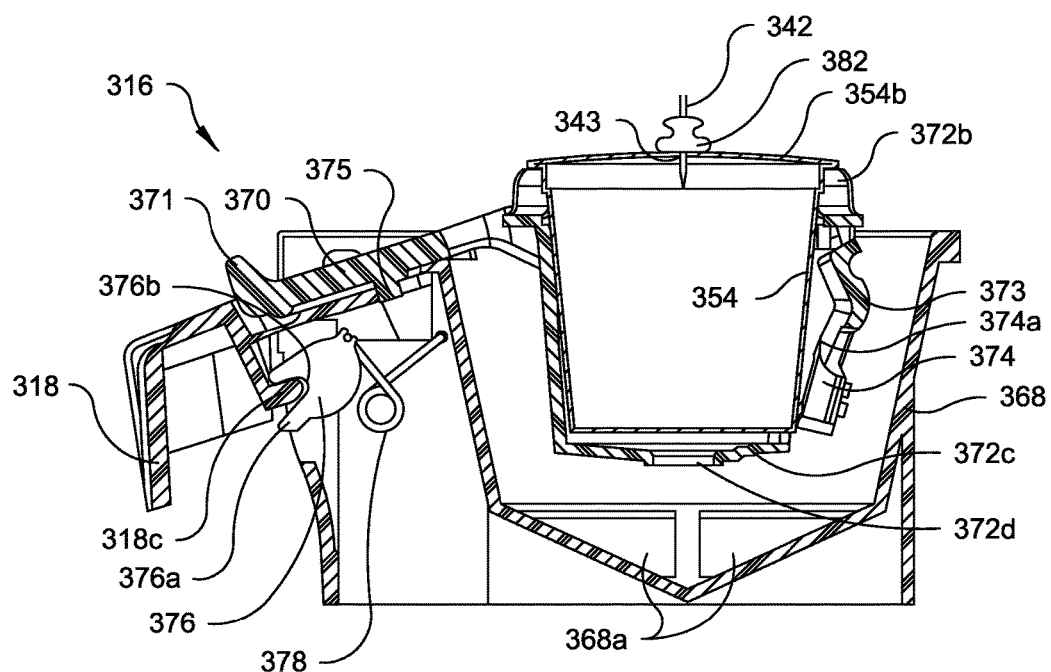
FIG. 8 is another cross-sectional side elevational view of certain components thereof, wherein the handle is shown in an angled or upward position.

The handle 318 preferably assists in inserting or removing the basket 368 from the housing 312, but the handle 318 may provide additional functionality as described in detail below. As shown in FIGS. 7 and 8, the handle 318 is preferably pivotally attached to at least a portion of the basket 368. More specifically, as shown in FIG. 5, at least one and preferably two spaced-apart pivot pins 318a extend outwardly from a portion of the handle 318 and are received in opposing slots 368b in the basket 368. The complementary engagement between the pivot pins 318a and the slots 368b permit the handle 318 to move between a level or horizontal position (see FIG. 7) and an angled or upward position (see FIG. 8). In the horizontal position, the handle 318 is preferably level and the basket 368 can be inserted into and removed from the housing 312. In the upward position, the discharge port 342 preferably pierces the lid 354b of the container 354 to create the first hole 343. Additional description of the pivoting movement of the handle 318 and structure that permits and/or facilitates such movement is described in detail below.

The support fork 370 is preferably pivotally, slidably and/or removably attached to at least a portion of the handle 318. More specifically, as shown in FIG. 5, at least one and preferably two spaced-apart pivot pins 370a extend outwardly form a portion of the support fork 370 and are received in opposing slots 318b in the handle 318. The combination of the pivot pins 370a and the slots 318b allow the support fork 370 to be removed from, slide with respect to, and pivot upwardly with respect to the handle 318 to allow the container 354 to be more easily inserted into and/or removed from the cartridge holder 372. The support fork 370 is preferably separated from the handle 318 and removed from the basket 368 before operating the kitchen appliance 10 in the non-pressurized mode (e.g., to brew loose coffee grounds, such as done in an ADC).

Referring to FIGS. 5, 7 and 8, to pivot the support fork 370 upwardly with respect to the handle 318, a thumb tab 371 at one end of the support fork 370 is preferably pressed downwardly to pivot an opposing end of the support fork 370 upwardly. Thus, the support fork 370 may be pivoted with respect to the handle 318 to allow the container 354 to be more easily removed from the cartridge holder 372 and/or the drawer 316 without requiring the user to reach into the basket 368. As shown in FIGS. 7 and 8, a locator tab 375 preferably prevents the support fork 370 from inadvertently moving with respect to the handle 318. The locator tab 375 preferably extends downwardly from a bottom surface of the support fork 370, and is preferably received in a complementary groove in the handle 318. The locator tab 375 is removable from the groove, so as to slide the support fork 370 with respect to the handle 318, by depressing the thumb tab 371 to raise the locator tab 375 out of the groove.

The cartridge holder 372 is preferably pivotally attached to at least a portion of the support fork 370. More specifically, as shown in FIG. 5, at least one and preferably two spaced-apart pivot pins 372a extend radially outwardly from a portion of the cartridge holder 372 and are received in opposing slots 370b of the support fork 370. As shown in FIGS. 7-9D, the cartridge holder 372 preferably includes a first upper end 372b and an opposing second lower end 372c. The first end 372b is preferably completely open, and the second end 372c preferably has an opening 372d with a smaller cross-sectional area than the opening of the first end 372b. The container 354 is preferably inserted into and removed from the cartridge holder 372 through the first end 372b thereof. During operation of the pressurized mode, the first end 372b of the cartridge holder 372 is preferably generally coplanar with an upper end of the basket 368.

The cartridge holder 372 preferably includes a blade door 373 with a blade 374. The blade door 373 is preferably pivotally attached to the cartridge holder 372 between a first or radially inward position (see FIGS. 9A-9C) and a second or radially outward position (see FIGS. 7, 8 and 9D). The blade door 373 is preferably biased in the first position by a biasing member (not shown) proximate an upper end of the blade door 373. In the second position, the blade door 373 preferably generally closes a complementary opening 372b in a sidewall of the cartridge holder 373. At least a portion of the blade 374 preferably extends radially inwardly from an interior surface the blade door 373. The blade 374 preferably includes a sharp tip 374a at an upper end thereof. The sharp tip 374a is preferably spaced radially inwardly from a remainder of the blade door 373, and/or an opening may be formed in the blade door 374 proximate the sharp tip 374a of the blade 374. Such a configuration improves a cutting action of the blade 374, as understood by those skilled in the art.

Figure 9A:
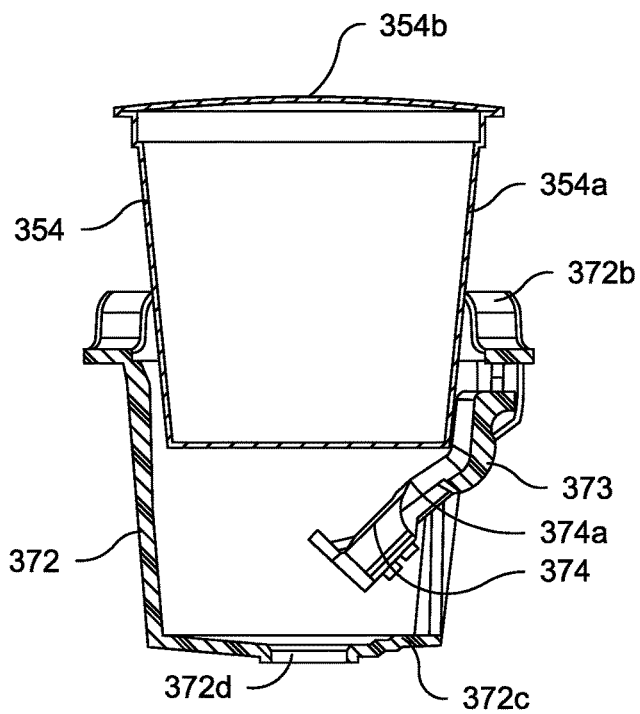
FIG. 9A is yet another cross-sectional side elevational view of certain components thereof, wherein a container is shown in an upward position with respect to a cartridge holder.

As shown in FIGS. 9A-9D, the blade 374 preferably pierces a portion of a sidewall and/or a bottom wall of the body 354a of the container 354 to create the second hole 345. In particular, prior to operating the kitchen appliance 310 in the pressurized mode, a lower end of the container 354 is preferably inserted into the first end 372b of the cartridge holder 372 (see FIG. 9A). The container 354 is preferably moved downwardly within the cartridge holder 372. As shown in FIG. 9A, an interior surface of an upper end of the blade door 373 preferably complements or conforms to a lower portion of the container 354 when the container 354 is first inserted into the cartridge holder 372.

Figure 9B:
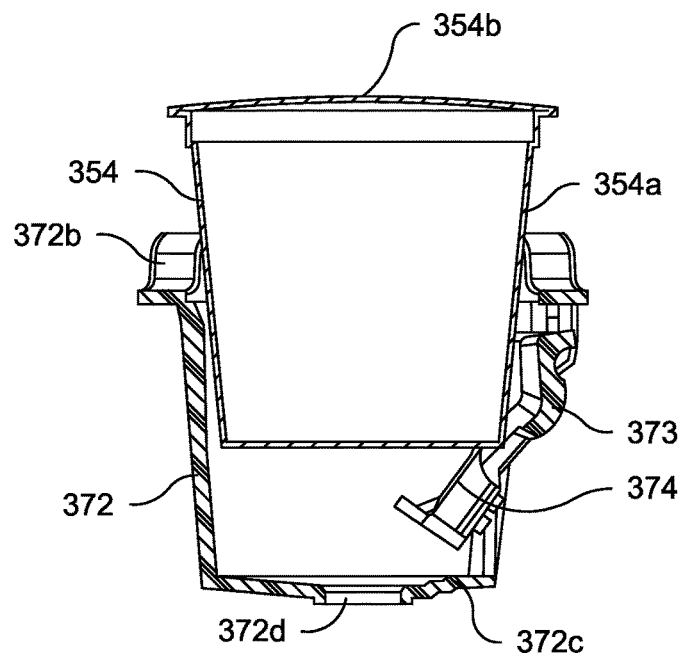
FIG. 9B is still another cross-sectional side elevational view of certain components thereof; wherein the container is shown being pushed downwardly with respect to the cartridge holder.

As shown in FIG. 9B, after moving the container 354 a predetermined distance downwardly with respect to the cartridge holder 372, a portion of the container 354 preferably contacts at least a portion of the blade door 373. As the container 354 continues to move downwardly, the downward force on the container 354 begins to overcome the biasing force on the blade door 373, so that the blade door 373 begins to pivot radially outwardly (counterclockwise when viewed in FIG. 9B) toward the sidewall of the cartridge holder 372. As the container 354 continues to move downwardly with respect to the cartridge holder 372, the sharp tip 374a of the blade 374 preferably contacts at least a bottom wall of the body 354a of the container 354. Further downward movement of the container 354 causes the blade 374 to pierce the bottom wall of the body 354a. The blade 374 is preferably spaced a sufficient distance radially inwardly from the blade door 373 such that a user cannot insert the container 354 into the cartridge holder 372 without at least a portion of the bottom wall thereof contacting the sharp tip 374a of the blade 374.

Figure 9C:
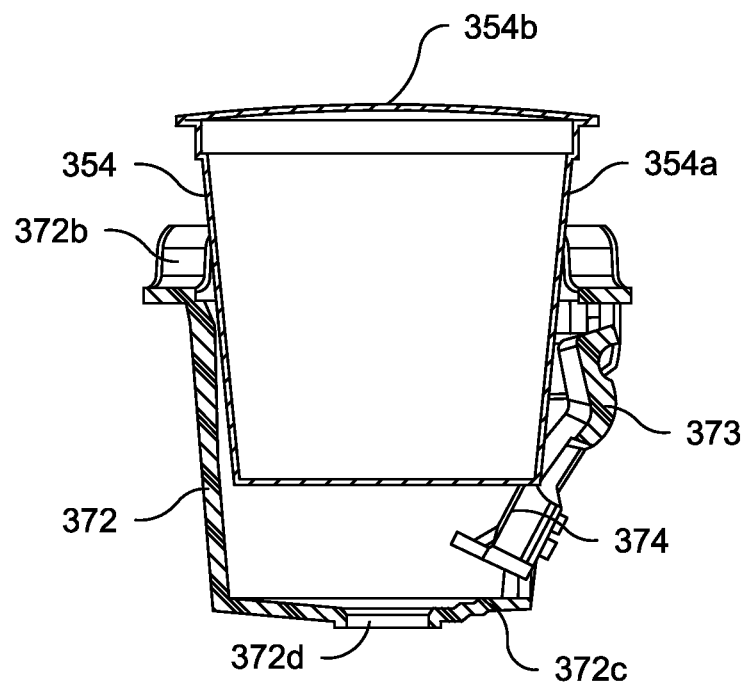
FIG. 9C is a further cross-sectional side elevational view of certain components thereof; wherein the container is shown being pushed further downwardly with respect to the cartridge holder.

As shown in FIG. 9C, as the container 354 continues to move downwardly with respect to the cartridge holder 372, the blade 374 continues to penetrate further into the bottom wall of the container 354. Eventually, the blade 374 preferably extends through the cavity of the container 354 and pierces at least a portion of the sidewall of the container 354. Essentially, as the container 354 is moved downwardly, the blade 374 creates a hole or cuts a portion of the container 354 from the bottom wall and/or side wall thereof. These containers are typically disposable. It should be noted that reusable containers may come with preexisting inlet and outlet holes so that piercing/cutting the container 354 is not needed.

Figure 9D:
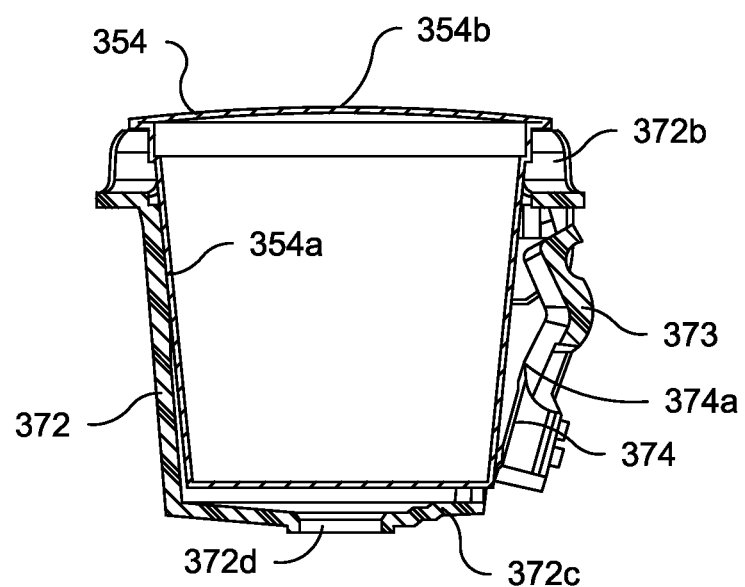
FIG. 9D is an additional cross-sectional side elevational view of certain components thereof; wherein the container is shown in a fully downward position with respect to the cartridge holder.

As shown in FIG. 9D, when the container 354 is pushed fully into the cartridge holder 372, the blade 374 will have passed completely through the container 354, thereby forming the second hole 345. When the second hole 345 is fully formed, the blade door 373 will be moved to the second position. It is preferred that the second hole 345 is created prior to the first hole 343. In other words, it is preferred that the container 354 is properly inserted into the cartridge holder 372 prior to the discharge port 342 being inserted into the lid 354b of the container 354.

To create the first hole 343, the drawer 316 is preferably initially inserted into the housing 312 with the handle 318, the fork 370 and the cartridge holder 372 being in the position and/or configuration shown in FIG. 7. In other words, it is preferred that the handle 318 is in the level or the horizontal position when the drawer 316 is initially inserted into the housing 312. To effectuate movement of the handle 318 from the horizontal position (see FIG. 7) to the upward position (see FIG. 8) to create the first hole 343, the drawer 316 preferably includes a latch pawl 376 and a basing member 378. The latch pawl 376 can have a generally eccentric or circular shape and is pivotally attached to a portion of the basket 368. The biasing member 378 is preferably an over-the-center spring. The latch pawl 376 preferably amplifies vertical movement of the handle 318 by rotating in close proximity to a portion of the handle 318.

In particular, a latch tab 318c preferably extends radially inwardly from a portion of the handle 318. The latch pawl 376 preferably includes a projection 376a and a groove 376b adjacent thereto. When the handle 318 is in the horizontal position (FIG. 7), the projection 376a is preferably positioned beneath the latch pawl 376 and the biasing member 378 preferably causes the latch pawl 376 to exert an upward force on the handle 318. When the handle 318 is moved from the horizontal (FIG. 7) to the downward position (FIG. 8), the latch pawl 376 preferably rotates such that the latch tab 318c of the handle 318 is positioned within the groove 376b of the latch pawl 376. When the handle 318 is in the downward position (FIG. 8), the latch tab 318c is preferably positioned within the groove 376b of the latch pawl 376 and the biasing member 378 preferably causes the latch pawl 376 to exert a downward force on the handle 318. The combination of the latch pawl 376 and the biasing member 378 help to maintain the handle 318 in the desired position and provide sufficient force to the container 354 so that the discharge port 342 pierces the lid 354b of the container 354. As shown in FIG. 8, a seal 382 may at least partially or completely surround the discharge port 342, which preferably prevents leaking when the discharge port 342 pierces the lid 354b of the container 354 and liquid flows therethrough. The container may be held against the seal by spring force as a means of compensating for assembly tolerances or weekly sealed containers.

FIGS. 10-15B illustrates another embodiment of the kitchen appliance 410. The reference numerals of the present embodiment are distinguishable from those of the earlier embodiment by a factor of four-hundred (400). The kitchen appliance 410 of the present embodiment is substantially similar to that of the previous embodiments. While certain like reference numerals may be shown in FIGS. 10-15B, the description of certain similarities between the embodiments may be omitted herein for the sake of brevity and convenience, and, therefore, is not limiting.

Referring to FIGS. 10 and 11, the housing 412 preferably includes the on/off button 486 and a display 488. The display 488 is preferably a liquid crystal display (LCD) capable of displaying and cycling through at least three separate icons for small, medium and large sizes of the vessel that receives the prepared beverage. In operation, a user preferably chooses a vessel size on the display 488 and then presses the on/off button 486 to initiate an operating mode or cycle. Alternatively, the user can simply press the on/off button 486 to brew the same vessel size as the last operating mode or cycle. It is preferred that the on/off button 486 can be pressed at any time to cancel the operating mode or cycle.

As shown in FIGS. 10-13, at least one fourth reservoir 480 is selectively removable from housing 412. The fourth reservoir 480 may be referred to as a secondary cold water ambient reservoir because liquid within the fourth reservoir 480 is preferably maintained at atmospheric pressure, regardless of whether the kitchen appliance 410 is operated in the pressurized or non-pressured mode. As shown in FIGS. 10-12, the fourth reservoir 480 may be removably attachable to a rear side of the housing 412. A second recess 414a on a rear side of the housing 412 is preferably sized, shaped and or configured to complementarily receive the fourth reservoir 480. The fourth reservoir 480 preferably allows a user to prepare a larger quantity of the beverage without having to manually refill the third reservoir 460 with liquid.

The fourth reservoir 480 preferably includes an outlet 481 formed in a lower portion of thereof, and at least a portion of a bottom wall of the fourth reservoir 480 may be slanted or sloped to direct liquid toward the outlet 481. The outlet 481 of the fourth reservoir 460 is fluidly connected to the third reservoir 460 in a manner to transmit fluid to the third reservoir but not vice versa. While it is preferred that the fourth reservoir 480 is a generally closed container that is separable from the housing 412, the fourth reservoir 480 is preferably not air-tight, such that the fourth reservoir 480 is maintained at atmospheric pressure. At least one optional liquid level sensor, such as a magnetic float switch (not shown), may be located in, on, and/or near the fourth reservoir 480. The liquid level sensor would be preferably operatively connected to and/or in communication with a printed circuit board (PCB) (not shown) of the kitchen appliance 410.

Figure 13:
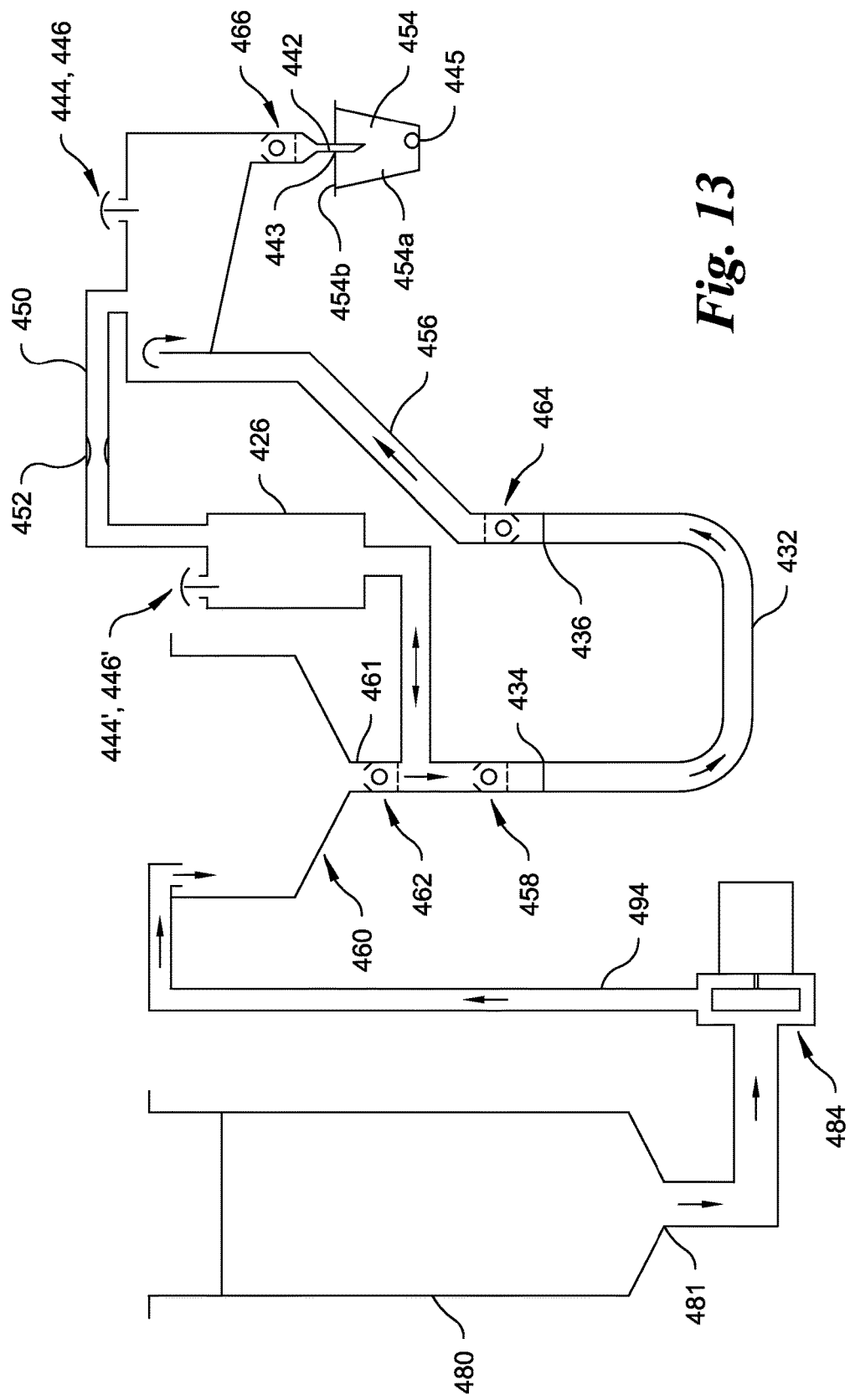
FIG. 13 is a schematic diagram of certain components thereof.

As shown in FIG. 13, a pump 484 is preferably positioned between and/or operatively connects the fourth reservoir 480 and the third reservoir 460. A fill or riser tube 494 preferably fluidly connects the pump 484 to the third reservoir 460. The pump 484 is not limited to being a certain type of pump, as the pump 484 may be a positive displacement pump, a water pump or an air pump, for example. The pump 484 preferably forces liquid from the outlet 481 of the fourth reservoir 480 into the third reservoir 460. Operation of the pump 484 can be automatic or controlled by a user through selective manipulation of the display 488 and/or the on/off button 486. The pump 484 can dispense or pump a user-chosen volume of liquid (e.g., small, medium or large) as determined by a time-based algorithm or other mechanism. The brew or heat cycle is then activated to brew/heat the entirety of the fluid in the third reservoir 460. Alternatively, a capacitance sensor (not shown) preferably located inside the housing 412, such as in the fill tube 494, may detect a level of liquid in the fourth reservoir 480 and alters or modifies operation of the pump to compensate for loss of pumped volume associated with reduced head height in the fourth reservoir 480. In particular, the capacitance sensor senses the permittivity of the liquid in the fourth reservoir 480 and controls the pump 484 accordingly.

Referring to FIGS. 14A-14F, the first hole 443 can be created in the lid 454b of the container 454 by moving the container 454 into engagement with the stationary discharge port 442. In particular, at least one four-bar linkage 490 preferably movably attaches a funnel 472 to a drawer 468. The four-bar linkage 490 may be located on each of two opposing sides of the cartridge holder funnel. In particular, at least two spaced-apart and parallel bars 490a, 490b of each four-bar linkage 490 are positioned between and operatively connect the funnel 472 and the drawer 468. A first or upper end of each bar 490a, 490b is preferably pivotally attached to the funnel 472 proximate the first upper end 472b thereof. A second or lower end of each bar 490a, 490b is preferably pivotally attached to an interior surface of the drawer 468 proximate a lower end thereof. As described in detail below, when a drawer assembly 416 is properly inserted into the housing 412 and the funnel 472 is properly inserted into the drawer 468, the four-bar linkage 490 effectuates movement of the funnel 472 upwardly with respect to the drawer 468 to cause the discharge port 442 to pierce the lid 454b of the container 454 to create the first hole 443.

As shown in FIGS. 14A-14F, when the drawer assembly 416 is initially inserted into the housing 412, both the drawer 468 and the funnel 472 move horizontally or generally parallel to the support surface. However, when the drawer assembly 416 is moved a sufficient or predetermined distance inwardly into the housing 412, an inward portion of the funnel 472 preferably contacts a portion of the interior of the housing 412. The contact of the funnel 472 and the interior of the housing 412 causes the horizontal movement of the funnel 472 to transfer to vertical movement by the four-bar linkage 490. In particular, the funnel 472 begins to move at least partially upwardly while the drawer 468 continues to move horizontally into the interior of the housing 412. The funnel 472 preferably moves upwardly a sufficient distance so that the discharge port 442 pierces the lid 454b of the container 454 to create the first hole 443 and to at least slightly compress a seal 482 surrounding at least a portion of the discharge port 442.

Figure 14A:
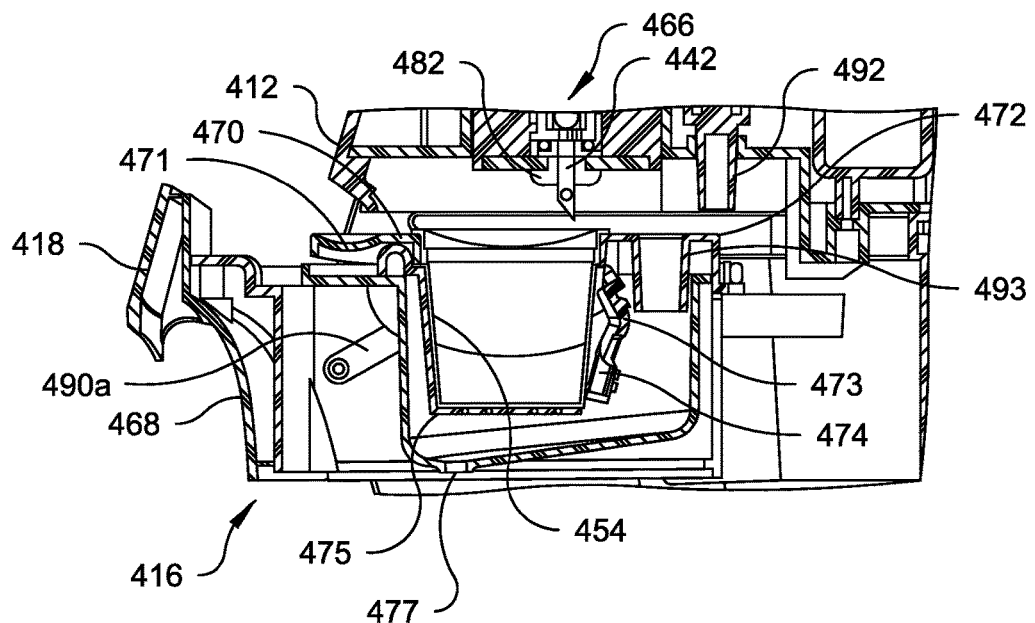
FIG. 14A is a partial cross-sectional side elevational view thereof, wherein the drawer is shown partially separated from the housing.
Figure 14B:
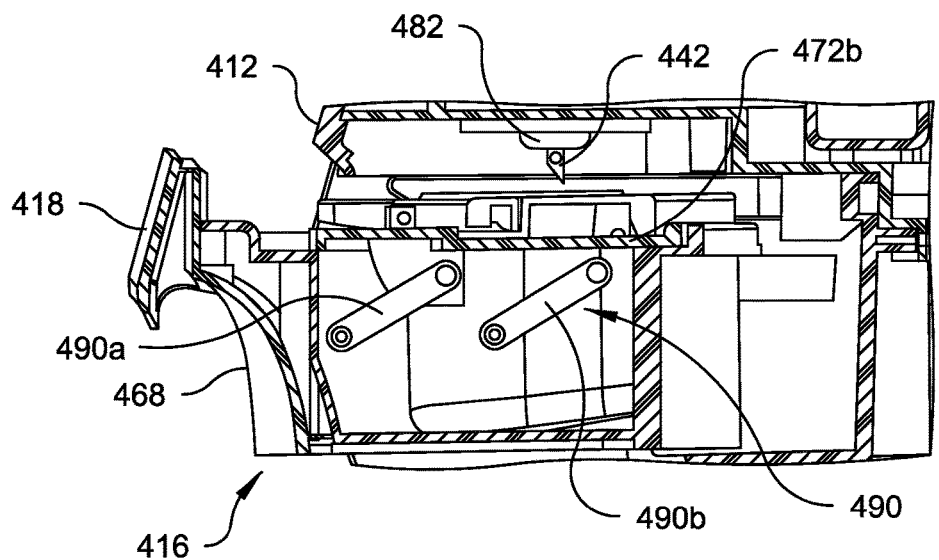
FIG. 14B is another partial cross-sectional side elevational view thereof, wherein the drawer is shown in the same partially separated position as in FIG. 14A.
Figure 14C:
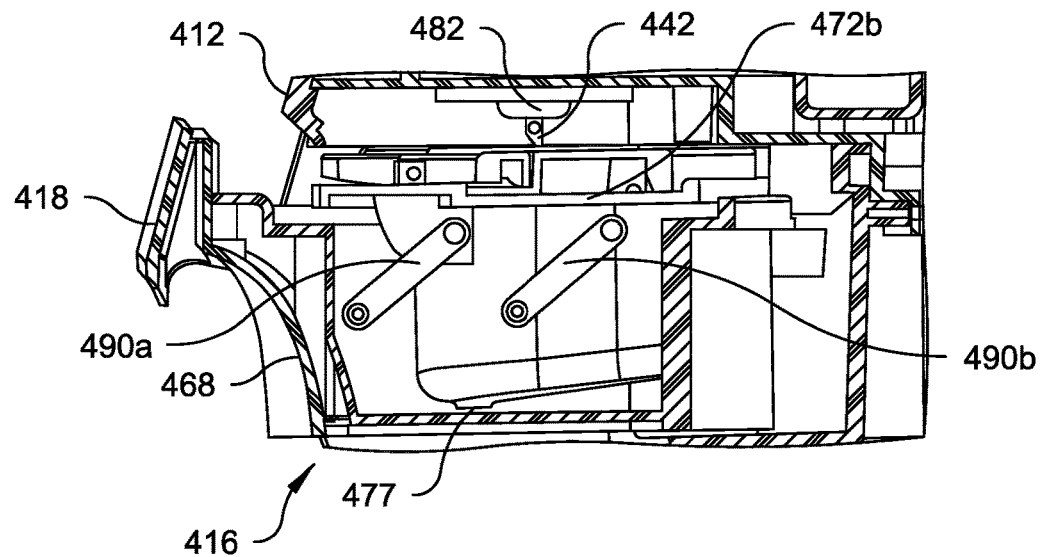
FIG. 14C is yet another partial cross-sectional side elevational view thereof, wherein the drawer is shown further inwardly into the housing when a discharge point is in contact with a container.
Figure 14D:
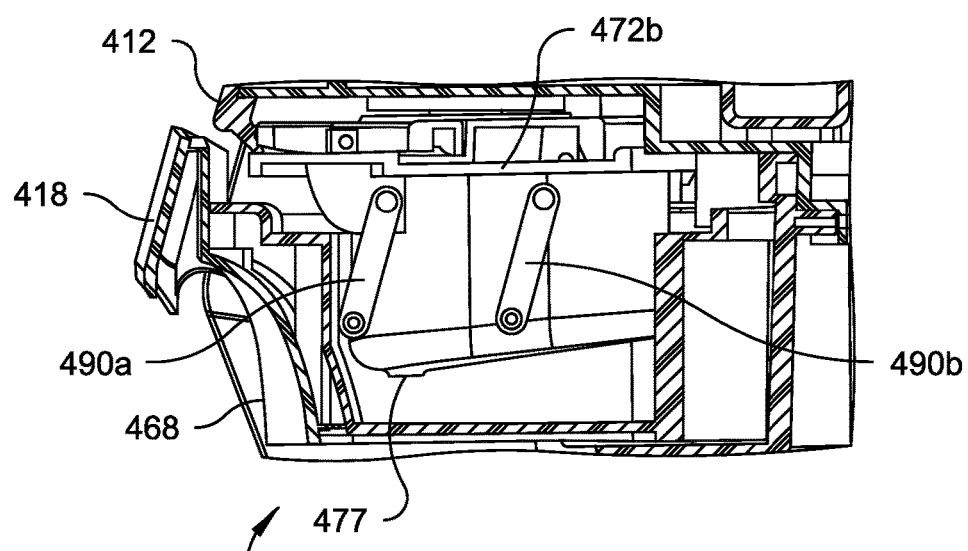
FIG. 14D is still another partial cross-sectional side elevational view thereof, wherein the drawer is shown still further inwardly into the housing when the container is pierced by a discharge port.
Figure 14E:
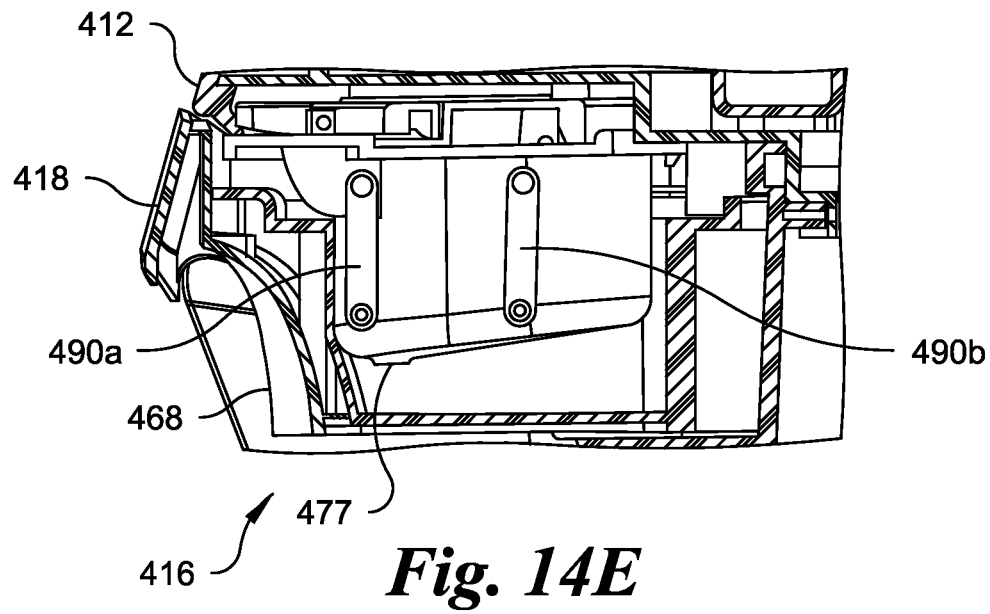
FIG. 14E is a further cross-sectional side elevational view of thereof, wherein the drawer is shown essentially fully inserted into the housing.
Figure 14F:
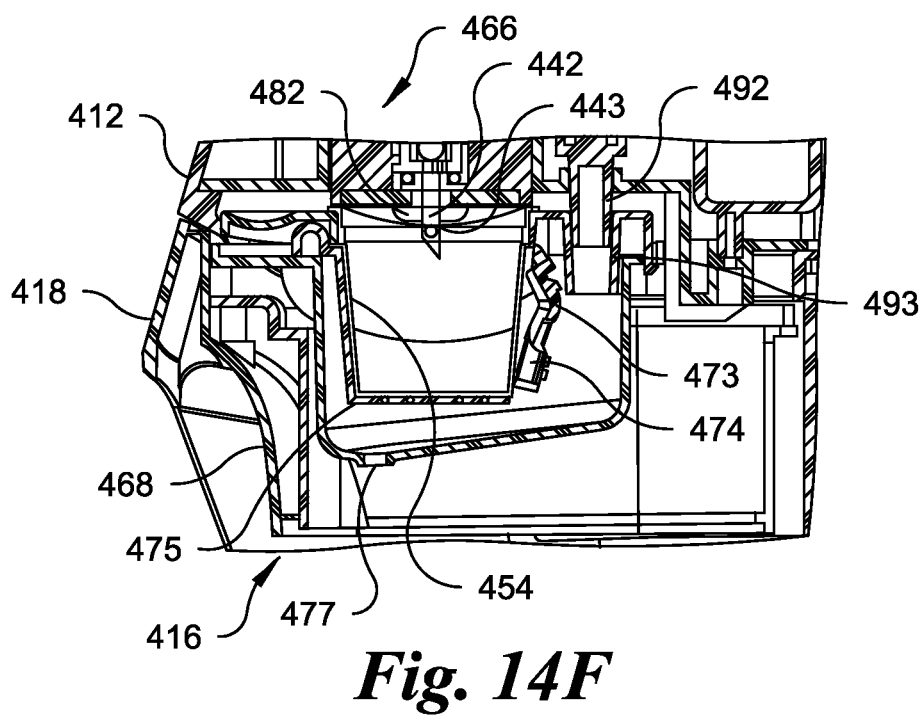
FIG. 14F is an additional cross-sectional side elevational view thereof, wherein the drawer is shown fully inserted into the housing.

Referring to FIGS. 14A and 14F, the container 454 is supported within funnel 472 via cartridge holder 475. A projection 492 preferably extends downwardly in the interior of the housing 412 and/or into the recess 414. A complementary slot or opening 493 is preferably formed in at least a portion of the cartridge holder 475. The combination of the projection 492 and the opening 493 preferably ensure the proper positioning of the container 454 and the discharger port 442 to create the first hole 443. When the drawer assembly 416 is at least partially removed from the housing 412 (see FIG. 14A), the opening 493 of the cartridge holder 475 is preferably positioned below and laterally outwardly from the projection 492 of the housing 412. As the drawer assembly 416 is properly inserted into the housing 412 and the funnel 472 contacts the interior of the housing 412, at least a lower tip of the projection 492 is preferably vertically aligned with the opening 493. As the funnel 472 and cartridge holder 475 move upwardly via the four-bar linkage 490, the projection 492 is preferably inserted further into the opening 493. When the drawer assembly 416 is removed from the housing 412 at the end of an operating cycle in the pressurized mode, the opening 493 is moved downwardly out of engagement with the projection 492 as the four-bar linkage 490 and gravity move the funnel 472 and cartridge holder 475 downwardly into the drawer 468.

Figure 15A:
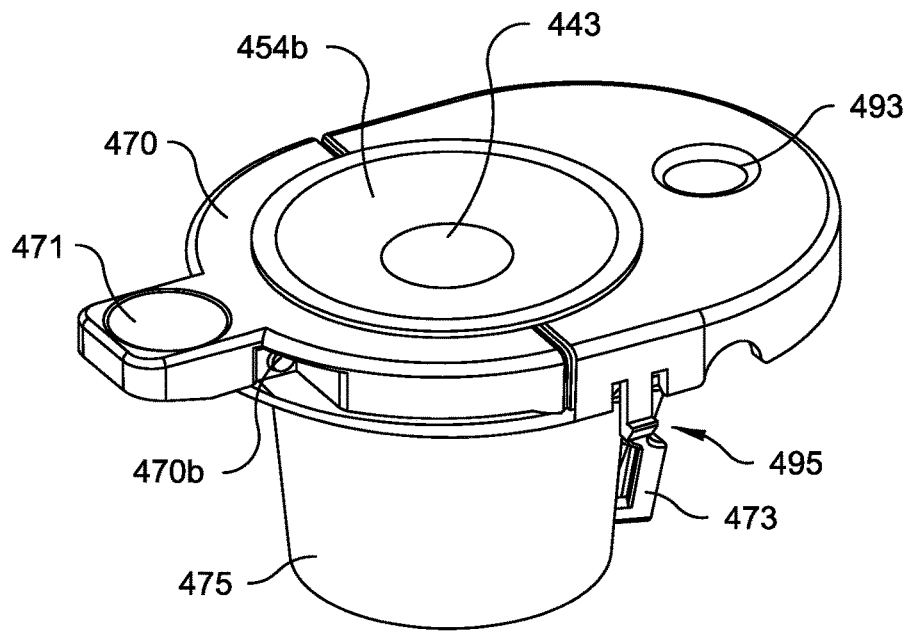
FIG. 15A is a perspective view of a combination of an ejection fork, the cartridge holder and the container of the kitchen appliance according to one embodiment.
Figure 15B:
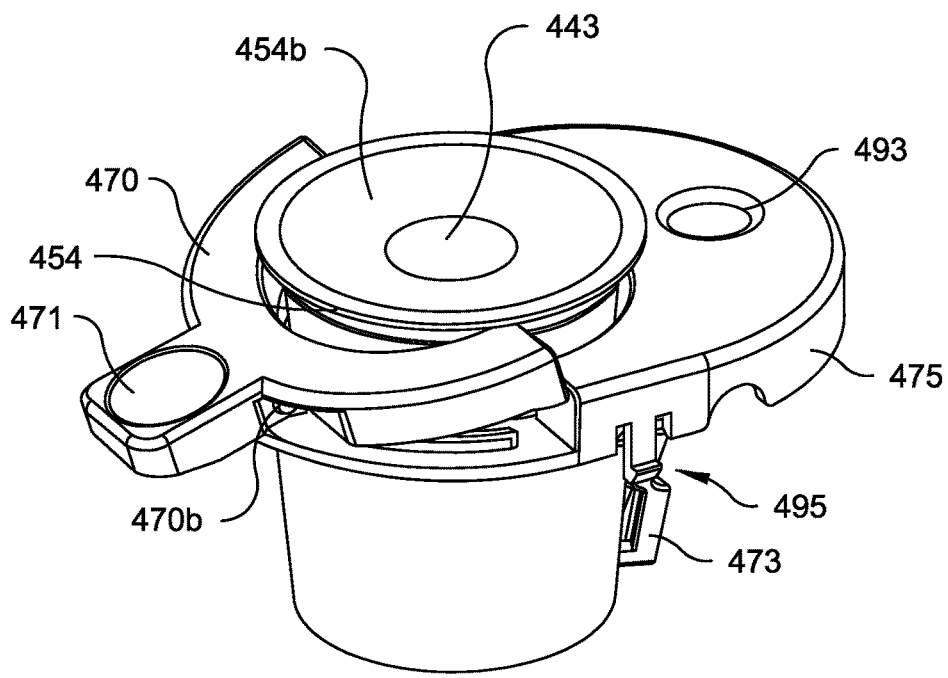
FIG. 15B is a top perspective view thereof; wherein the container is shown in a partially ejected position.

Referring now to FIGS. 15A and 15B, the pivoting action of an ejection fork 470 assists the user in removing a spent container 454 following the completion of an operating (pressurized) cycle. When the drawer assembly 416 is properly inserted into the housing 412 (either before or after an operating cycle in the pressurized mode), the ejection fork 470 is preferably in a horizontal position (see FIG. 15A). When an operating cycle in the pressurized mode is completed, the container 454 is preferably removed from the drawer assembly 416 by first pivoting the ejection fork 470 from the horizontal position to an upward position (see FIG. 15B). The ejection fork 470 is preferably pivotally attached to the cartridge holder 475 by at least one pin 470b. The ejection fork 470 is preferably pivoted from the horizontal position to the vertical position by depressing the thumb tab 471 of the ejection fork 470. When the ejection fork 740 is in the upward position (FIG. 15B), the container 454 is raised at least slightly above the cartridge holder 475, thereby facilitating removal of the container 454 from the drawer assembly 416.

Cartridge holder 475 includes a cutting assembly 473 with a blade 374. The cutting assembly 473 is pivotally attached to the cartridge holder 475 between a first or radially inward position. Operation of cutting assembly 473 and blade 474 is the same as the above-described blade door 373. In an embodiment depicted by FIGS. 14A-14F, a user can selectively remove cartridge holder 475 from funnel 472. A filter basket (not illustrated) can interchangeably be placed in funnel 472. The filter basket would include an integrated screen or filter or could support a disposable filter. The user could load loose infusible material or soft pods into the filter basket. During unpressurized operation of appliance 410, fluid would exit the second reservoir via the discharge port 442. The fluid would then interact with the loose infusible material or grounds and pass through the filter basket to the funnel 472. In both the pressurized mode (i.e., with a container restricting flow through discharge port 442) or unpressurized mode (i.e., brewing loose infusible material, soft pods, or the like), the fluid passes from the cartridge holder 475 or the filter basket, respectively, into funnel 472. Funnel 472 may include a sloped floor to a funnel outlet 477. The brewed beverage drains from funnel outlet 477 into a user's receptacle.

A preferred method of operating the kitchen appliance 410 includes removing the fourth reservoir 480 from the housing 412, filling the fourth reservoir 460 with water or another liquid, and re-attaching the fourth reservoir 460 to the housing 412. The user removes the drawer assembly 416 from the housing 412 either before, during, or after any one of the above-identified steps. For an operating cycle using the container 454 (i.e., the pressurized mode), the user places the container 454 in the cartridge holder 475 until the lid 454b of the container 454 is generally flush with the first upper end 472b of the cartridge holder 475 and ejection fork 470. Simultaneously, the second hole 445 is created in the container 454 by the blade 474 as the container 454 moves downwardly into the cartridge holder 472. For an operating cycle that does not employ the container 454 (i.e., the non-pressurized mode), such as when brewing loose coffee grounds, soft pods, or the like, the user removes at the cartridge holder 475 from the funnel 472 and inserts a filter basket (not shown) into the funnel 472. Foodstuff is then inserted into the filter basket to prepare the beverage. As shown in FIGS. 15A and 15B, locking tabs 495 on opposing sides of the cartridge holder 475 allow the cartridge holder 475 to be easily secured to and removed from the funnel 472.

The user places the drawer assembly 416 into the housing 412 until an exterior surface of the handle 418 is generally flush with an exterior surface of the housing 412 (see FIG. 10). In the fourth embodiment, the handle 418 is fixedly or non-movably attached to the drawer 468. As described above, the four-bar linkage 490 moves the funnel 472 into the proper position. A vessel is placed or positioned within the recess 414 of the housing 412 to collect or receive the prepared beverage. The user chooses a vessel size, such as through the display 488, and then depresses the on/off button 486 to initiate an operating cycle. Alternatively, the user can simply depress the on/off button 486 to create the same amount of the beverage as the last time an operating cycle was initiated.

Once an operating cycle is initiated, in one embodiment the PCB references, senses or otherwise communicates with the optional liquid lever sensor to make sure that the fourth reservoir 480 includes a sufficient amount of liquid to complete an operating cycle. If there is an insufficient amount of liquid, the display 488 will indicate that the user should add liquid to the fourth reservoir 480. The indication could be in the form of one or more flashing icons (none shown). If a sufficient amount of liquid is present in the fourth reservoir 480 to complete an operating cycle, the PCB will energize the pump 484 to move liquid from the fourth reservoir 480, through the pump 484, up the fill tube 494 and into the third reservoir 460.

Gravity moves liquid from the third reservoir 460, through the primary check valve 462 and into the T-connection of the first reservoir 426. Due to gravity, liquid will freely pass from the first reservoir 426, through the inlet check valve 458 and into the HWG 432. Liquid will continue to move via gravity into and through the HWG 432 and into the riser tube 456. Liquid will pass through the outlet check valve 464 and continue upwardly in the riser tube 456 until the liquid reaches equilibrium with liquid in the third reservoir 460. For example, equilibrium may be reached when a level of liquid in the third reservoir 460 is generally equal to a level of liquid in the riser tube 456. The outlet check valve 464 prevents a vacuum created by the eventual phase change of gas (e.g., steam) to liquid (e.g., water) in the HWG 432 from drawing liquid from the riser tube 456 back into the HWG 432.

After a relatively short duration from when the pump 484 is first energized, the HWG 432 will be energized by a relay from the PCB. The HWG 432 then heats the liquid within the system and generate saturated gas bubbles. The gas bubbles increases the pressure of the liquid within the HWG 432 and act to move heated liquid within the HWG 432. Since the inlet check valve 458 prevents liquid from moving out of the HWG 432 and back into the first or third reservoirs 426, 460 heated liquid is forced out of the HWG 432, into the riser tube 456, and into the second reservoir 440.

In the pressurized mode (i.e., where discharge port 442 restricted by a container/foodstuff), the pressure within the system increases. The pressure in the second reservoir 440 pushes liquid from the second reservoir 440 through the discharge check valve 466, the discharge port 442 and the container 454 and into the vessel to be consumed by the user. At least some of the pressure and will pass through a fluid path 450 (opening or conduit) and into the first reservoir 426, which acts to equalize the pressure between the inlet end 434 and the outlet end 436 of the HWG 432. Shortly thereafter, gas in the HWG 432 will begin to condense and create a vacuum. The vacuum in the HWG 432, combined with the increased pressure in the first reservoir 426, will act to draw more liquid through the inlet check valve 458 into the HWG 432. The outlet check valve 464 prevents previously-heated liquid from reentering the HWG 432 from the riser tube 456.

After fluid leaves the HWG 432, gas in the fluid can begin to condensate because the gas is no longer subjected to the relatively high heat of the HWG 432. The condensation may create a vacuum in the riser tube 456 and/or the second reservoir 440. The discharge check valve 466 prevents foodstuff and/or gas in the drawer assembly 416 from being drawn into the second reservoir 440. The vacuum will pass through the conduit 450 and into the first reservoir 426. The vacuum in the first reservoir 426 will draw liquid from the third reservoir 460, through the primary check valve 462 and into the first reservoir 426. The movement of liquid from the third reservoir 460 into the first reservoir 426 will act to equalize, reduce or eliminate the vacuum.

The system will repeat or otherwise continue the above-described pressure/vacuum cycle until all liquid in the third reservoir 460 and the first reservoir 426 is consumed (i.e., passed through the discharge port). After all or substantially all fluid is forced out of the HWG 432, a temperature of the HWG 432 will increase until a thermostat or other mechanism (not shown) opens or otherwise terminates energy to the HWG 432. For example, a sensor (not shown) on a thermostat could signal the PCB to open a relay on the PCB and terminate the current operating cycle. The drawer assembly 416 can then slide out and/or removed from the housing 412 to either dispose of the spent container 454 and/or clean the drawer 468 in preparation for a later operating cycle.

Those skilled in the art will understand that a consistency or density of foodstuff in the container 454 and foodstuff prepared without the container 454 is typically not consistent. Some types or commercially-available brands of containers 454 provide significantly more resistance or restriction at the point of discharge from the appliance. In the case of high resistance, potentially not all of the heated fluid in the system will be pumped through the container 454 for any given pressure cycle. If this occurs, liquid may pool in the second reservoir 440 and eventually fill the second reservoir 440.

When the second reservoir 440 is filled with liquid, liquid may flow through the fluid path 450 and contact the optional restriction 452. Since liquid is more viscous than gas, the restriction 452 offers increased resistance to liquid passing through the fluid path 450. As a result, the pressure within the second reservoir 440 will remain higher (relative to the first reservoir and ambient conditions) for a longer duration, which creates a greater downward force on the heated fluid to push more heated liquid into the container 454. Any amount of fluid that may pass through the fluid path 450 will flow into the first reservoir 426, which can increase a temperature of the liquid entering the HWG 432. A higher inlet liquid temperature will cause the HWG 432 to pump faster and produce a greater volume of gas, which will increase the pressure in the second reservoir 440 and create a greater downward force on the heated fluid to push more heated liquid into the container 454. When the second reservoir 440 is partially or almost completely filled with liquid, the vacuum phase of the operating cycle will pull any fluid in the fluid path 450 back into the second reservoir 440. Gas located on the first reservoir 426 side of the conduit 450 can move through the optional restriction 452 in the fluid path 450, which allows the vacuum cycle to exist even during the higher pressures created by foodstuff in the container 454.

FIGS. 16-21B illustrate yet another embodiment of the kitchen appliance 510. The reference numerals of the present embodiment are distinguishable from those of the earlier embodiment by a factor of five-hundred (500). The kitchen appliance 510 of the present embodiment is substantially similar to that of the previous embodiments. While certain like reference numerals may be shown in FIGS. 16-21B, the description of certain similarities between the embodiments may be omitted herein for the sake of brevity and convenience, and, therefore, is not limiting.

Referring to FIGS. 17-20, a distinguishing feature of the kitchen appliance 510 is the inclusion of a selector valve 596 connected to the outlet end 536 of the HWG 532. The selector valve 596 permits a user to selectively switch between and/or operate the kitchen appliance 510 in the pressurized mode (i.e., greater than atmospheric pressure), as described in detail above, or the non-pressurized mode (i.e., at or near atmospheric pressure), as described in detail above. At least a portion of the selector valve 596 may be directly connected to the outlet end 536 of the HWG 532. Alternatively, the riser tube 556 and/or an additional pipe or conduit 557 may connect the selector valve 596 to the HWG 532.

For the sake of brevity, a description of the pressurized and non-pressurized modes is not repeated herein, as one of ordinary skill in the art would understand the operation of each mode from the description provided above with respect to the other embodiments of the present disclosure. However, a unique feature of the kitchen appliance 510 as compared to the above-described devices is the inclusion of a varied control sequence. In particular, the kitchen appliance 510 preferably includes an electronic control. In operation, a control sequence of the kitchen appliance 510 may de-energize or reduce the operating temperature of the HWG 532 for a relatively short period of time at at least one critical point or period in the brew cycle. De-energizing or at least temporarily reducing the temperature of the HWG 532 preferably quells the HWG 532 and reduces the percentage of steam the HWG 532 pumps toward the end of the brew cycle. Similar to the other embodiments described above, when the desired amount of a combination of liquid infused by the foodstuff flows into the selected vessel 515a, 515b or when a sufficient amount of liquid is no longer present within the kitchen appliance 510, the HWG 532 is preferably automatically deactivated (e.g., shuts-off by a sensor) and the operating cycle is complete.

The selector valve 596 includes a valve housing 596a defining a cavity and a valve plate or stopper 596b positioned within the cavity and enclosed within the valve housing 596a. The valve plate 596b may be generally planar in shape with a pair of pads 596c on opposing sides or surfaces thereof. Each pad 596c may be generally circular in shape and be at least partially concave. Each pad 596c may be formed of a generally resilient or elastic material, such as a polymeric material. The selector valve 596 is not limited to the specific size, shape and/or configuration shown and described herein, as the selector valve 596 and any portions thereof may be modified to accomplish the functionality described herein.

Figure 21A:
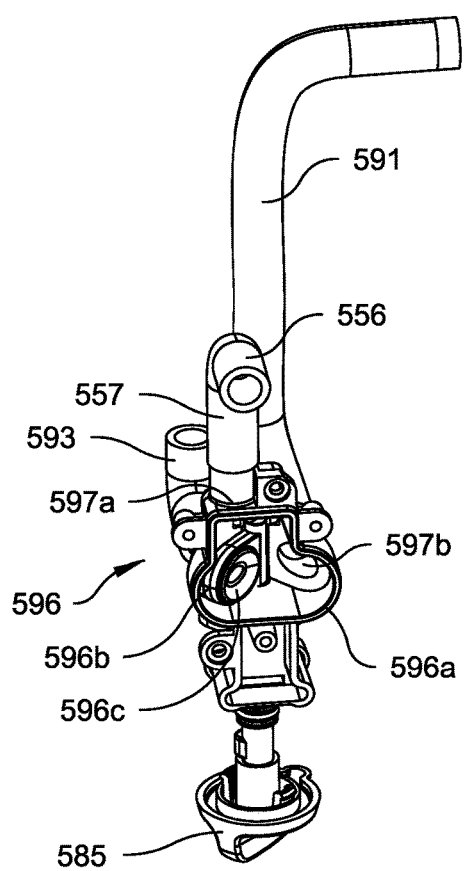
FIG. 21A is an enlarged bottom perspective view of certain portions of the kitchen appliance of FIG. 16, wherein at least a portion of a selector valve is shown in a first valve position.
Figure 21B:
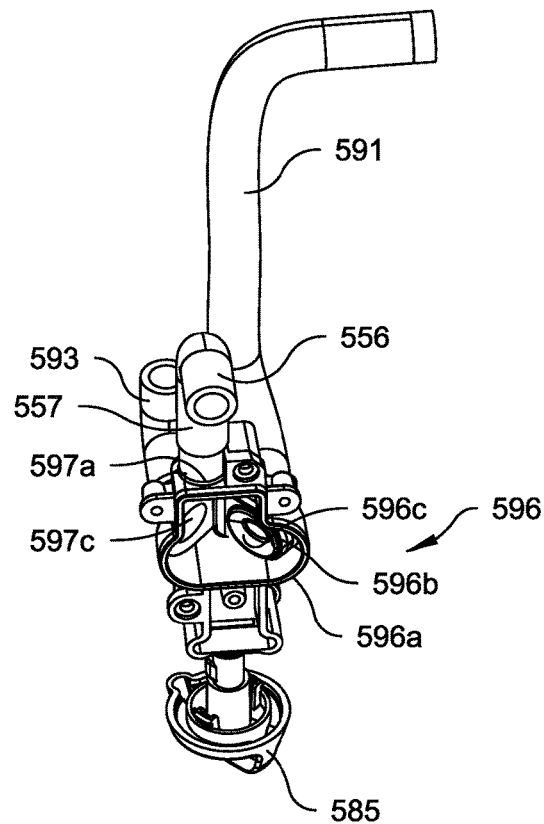
FIG. 21B is an enlarged bottom perspective view of certain portions of the kitchen appliance of FIG. 16, wherein at least a portion of a selector valve is shown in a second valve position.

To switch between the pressurized and non-pressurized modes, the valve plate 596b is preferably selectively pivotable within the valve housing 596a between a first valve position (see FIG. 21A) and a second valve position (see FIG. 21B). In the first valve position, the kitchen appliance 510 is configured to prepare the beverage at atmospheric pressure, such as done in a conventional ADC. When the valve plate 596b is in the first valve position, a user may place ground coffee, for example, in a conventional filter (not shown) that is inserted into a funnel or brew basket 579 (see FIG. 18). Liquid preferably travels from the third reservoir 560, and through the first reservoir (not shown), the HWG 532, the selector valve 596, a showerhead 583, the brew basket 579 and eventually into a vessel 515a (see FIG. 1), such as a carafe or coffee pot.

Figure 16:
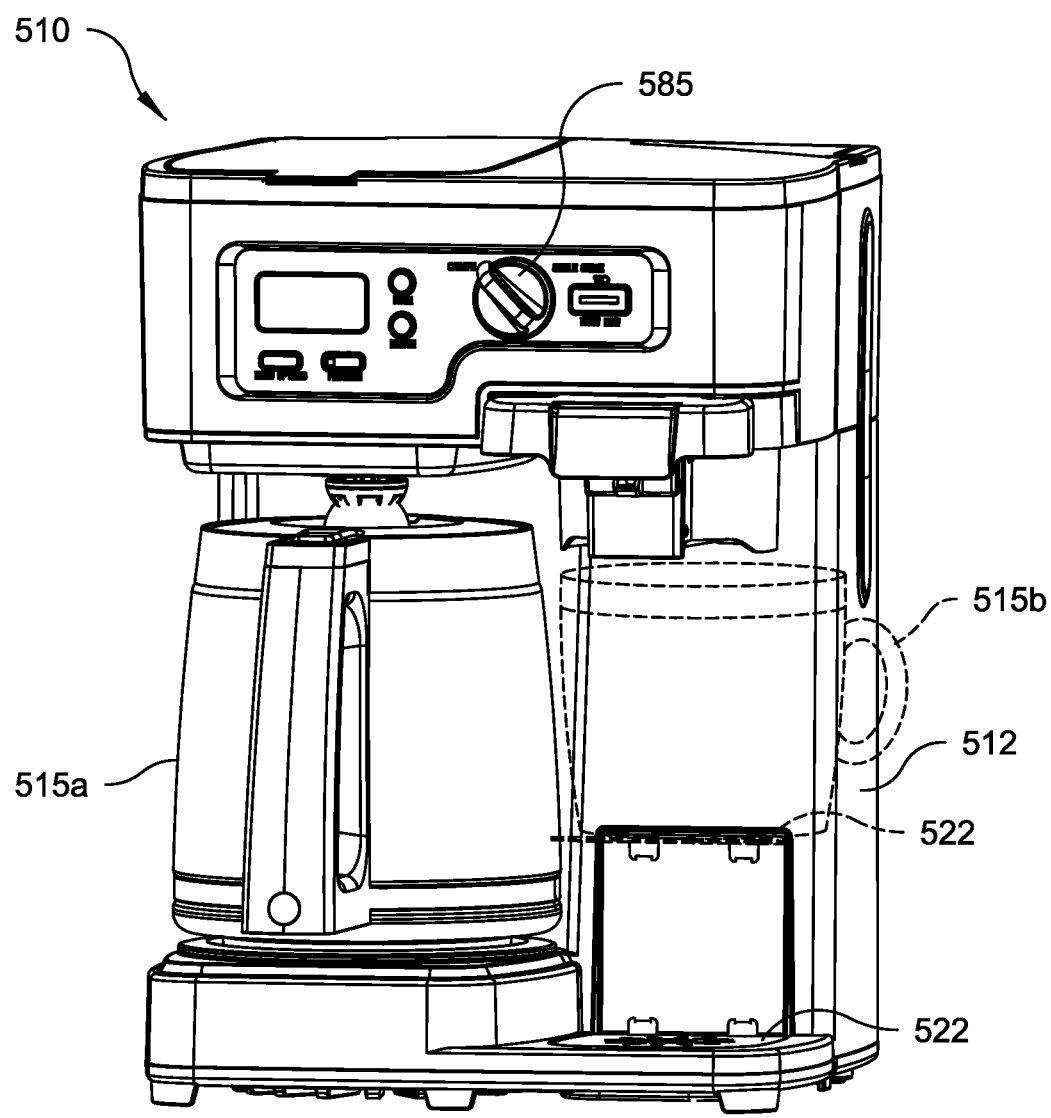
FIG. 16 is a top front perspective view of the kitchen appliance according to yet another embodiment of the subject appliance.
Figure 17:
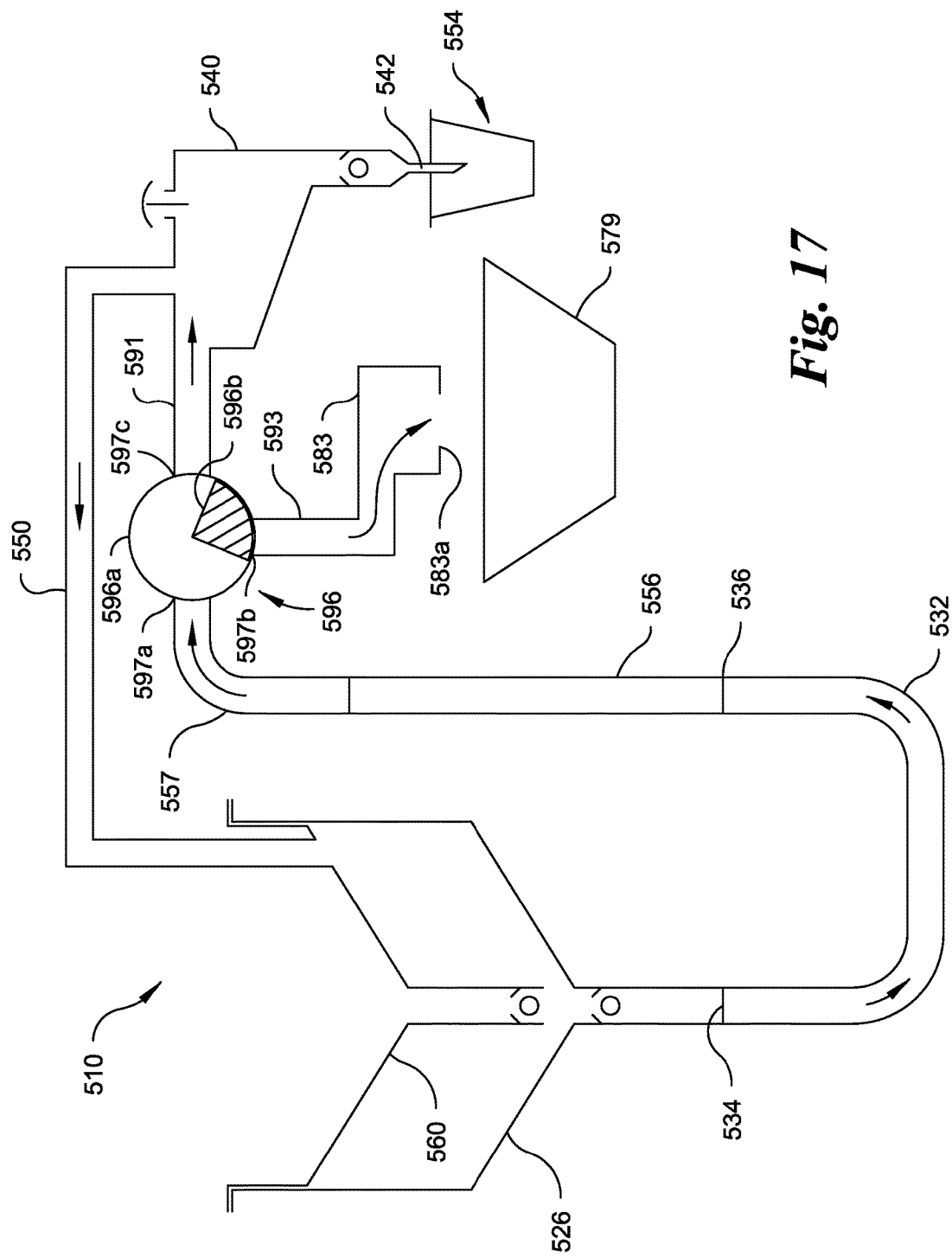
FIG. 17 is a schematic diagram of certain components of the kitchen appliance of FIG. 16.

In the second valve position, the kitchen appliance 510 is configured to prepare the beverage at a pressure greater than atmospheric pressure, such as when using a container 554 that at least partially encloses the foodstuff used to prepare the beverage, as described in detail above. When the valve plate 596b is in the second valve position, a user may place a cup, pot, travel mug or other vessel 515b (shown in phantom in FIG. 16) on a movable grate or platform 522 to receive the beverage to be consumed. As shown in FIG. 16, the platform 522 is vertically movable with respect to the housing 12 to accommodate vessels 515b of different sizes and/or to move the vessel 515b closer to or further away from the container 554. When the valve plate 596b is in the second valve position, activation of the HWG 532 increases an internal pressure within the generally closed system at both the inlet end 534 and the outlet end 536 of the HWG 532.

Figure 19:
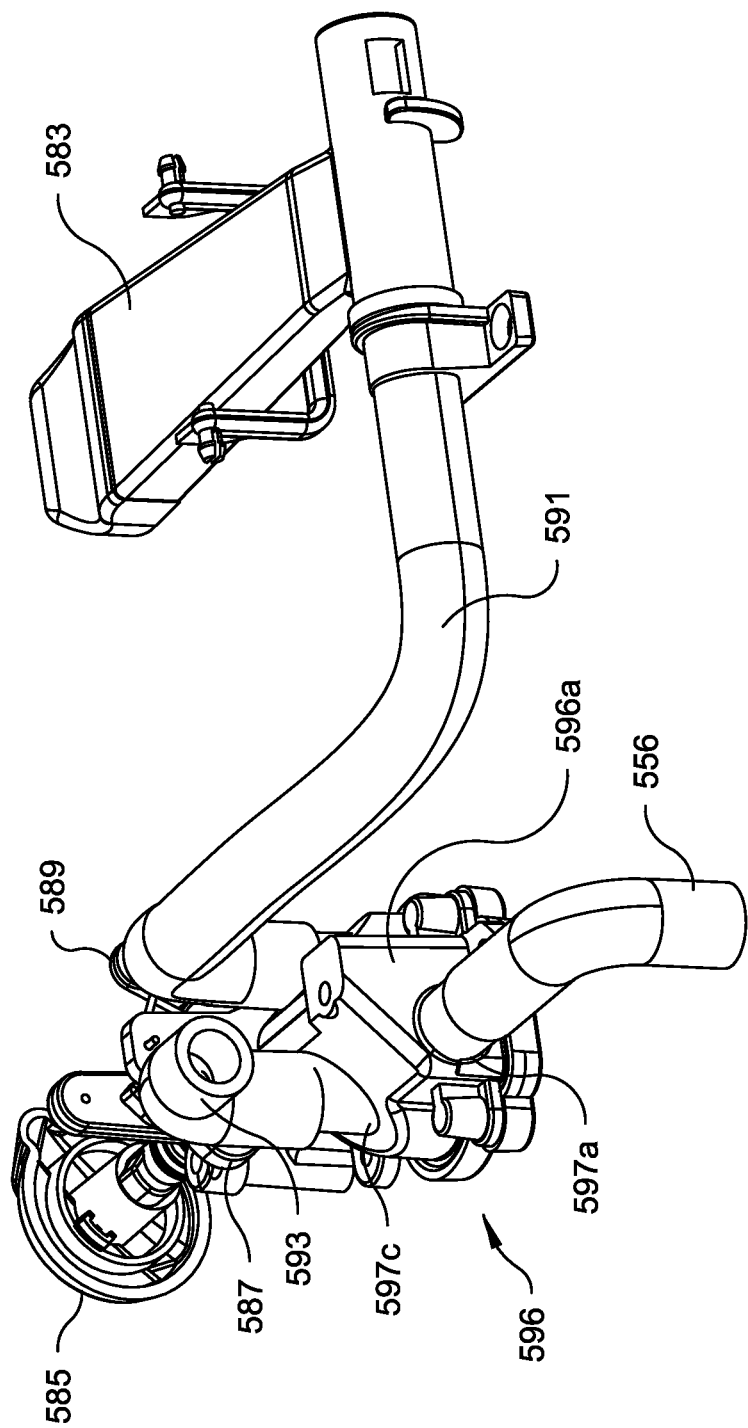
FIG. 19 is an enlarged top perspective view of certain portions of the kitchen appliance of FIG. 16.
Figure 20:
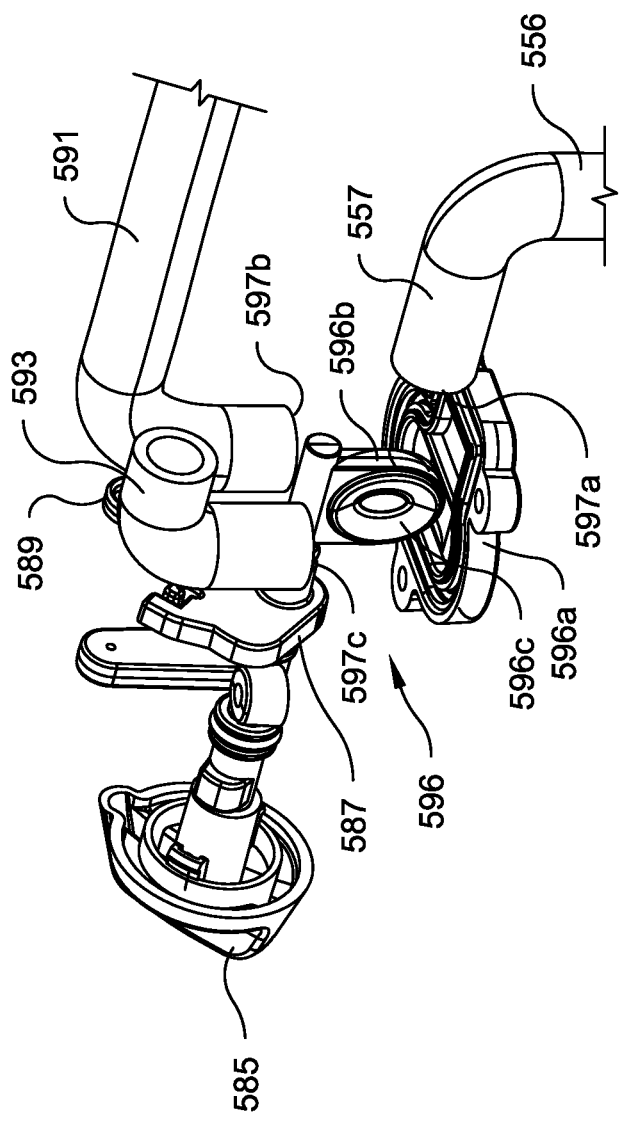
FIG. 20 is an enlarged side perspective view of certain portions of the kitchen appliance of FIG. 16.

As shown in FIGS. 19-21A, the valve housing 596a may have an inlet opening 597a, a first outlet opening 597b and a second outlet opening 597c. The inlet opening 597a is connected to the outlet end 536 of the HWG 532, the riser rube 556 and/or the additional pipe 557. As shown in FIGS. 20-21A, the first outlet opening 597b is connected to the showerhead 583, either directly or indirectly by an additional pipe 591. The first outlet opening 597b may be considered within a "non-pressurized flow path." The second outlet opening 597c is connected the second reservoir 540, either directly or indirectly by an additional pipe 593. The second outlet opening 597c may be considered within a "pressurized flow path." In the first valve position (see FIG. 21A), the valve plate 596b closes the second outlet opening 597c to permit liquid to flow only out of the valve housing 596a through the first outlet opening 597b and the non-pressurized fluid flow path. In the second valve position (see FIG. 21B), the valve plate 596b closes the first outlet opening 597b to permit liquid to flow only out of the valve housing 596a through the second outlet opening 597c and the pressurized fluid flow path.

The pressurized fluid flow path preferably includes the generally closed system formed of at least the first reservoir 526, the second reservoir 540, the fluid path 550 (see FIG. 17) therebetween that bypasses the HWG 532, the HWG 532 and the container 554 that at least partially encloses the foodstuff for preparing a beverage. When the valve plate 596b is in the second valve position (see FIG. 21B), activation of the HWG 532 increases a temperature of at least a portion of liquid within the system and effectuates movement of liquid in the HWG 532 to the second reservoir 540, through the discharge port 542 (see FIG. 17) thereof and into the container 554 to prepare a beverage, as described in detail above with respect to the other embodiments. The non-pressurized fluid flow path preferably includes at least the showerhead 583, which includes an outlet port 583a exposed to atmospheric pressure. The showerhead 583 is preferably positioned above the funnel or brew basket 579, which receives the filter for ground coffee, for example. When the valve plate 596b is in the first valve position (see FIG. 21A), activation of the HWG 532 increases a temperature of at least a portion of liquid within the HWG and effectuates movement of liquid in the HWG 532 to the showerhead 583 and through the outlet port 583a and into the brew basket 579 and eventually into the vessel 515a.

Figure 18:
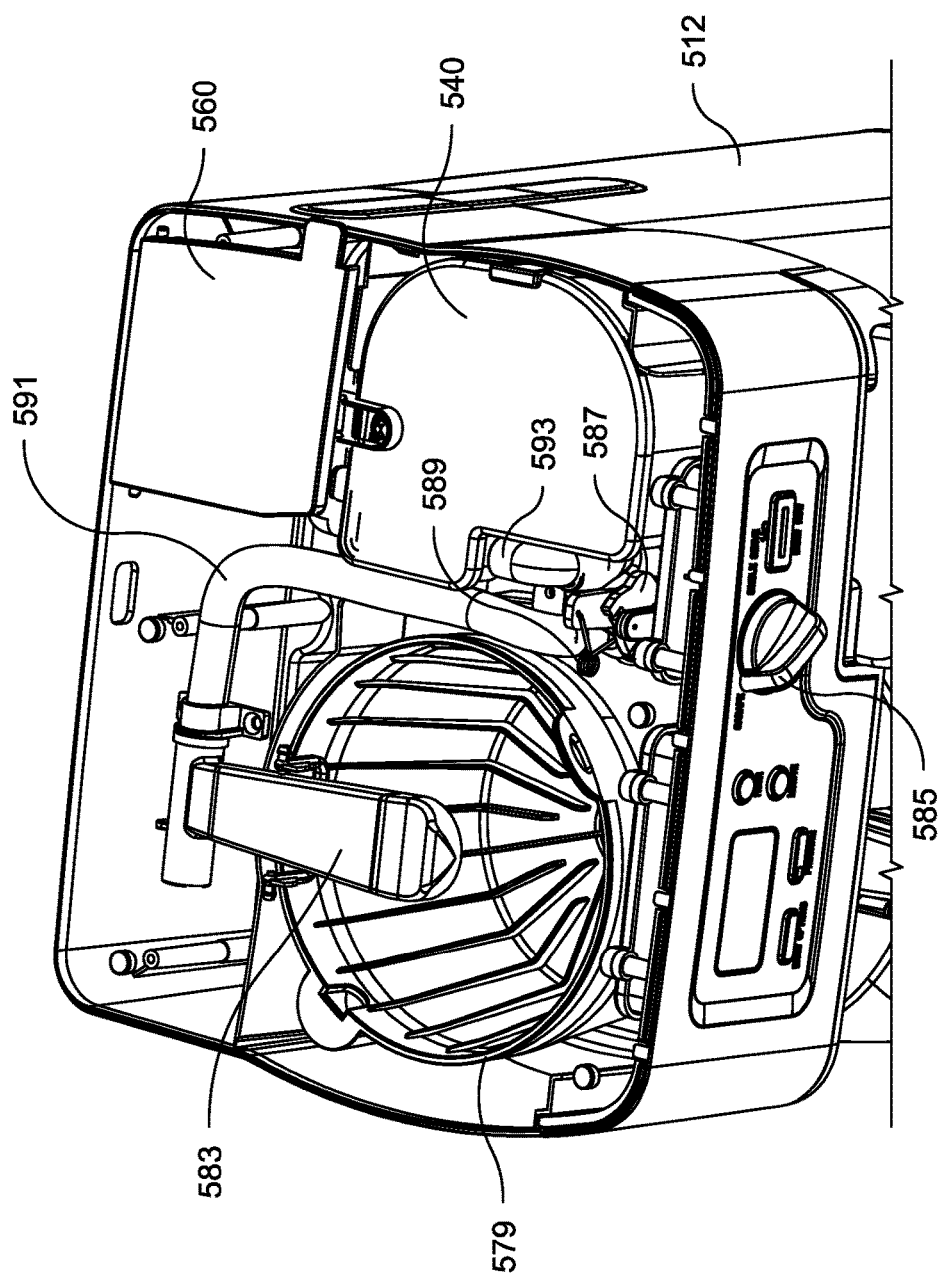
FIG. 18 is an enlarged top perspective view of the kitchen appliance of FIG. 16, wherein certain parts are removed for clarity.

Referring to FIGS. 16 and 18-21B, a knob 585 may be at least partially exposed on an exterior of the housing 512 of the kitchen appliance 510 to allow the user to selectively move the valve plate 596b between the first and second valve positions. More specifically, the knob 585 may be rotatably mounted to the exterior of the housing 512. Engagement, depression and/or rotation of the knob 585 may cause the valve plate 596b to pivot between the first and second valve positions. As shown in FIGS. 18-20, a cam 587 may be operatively connected to the knob 585 and positioned between the knob 585 and the valve housing 596a within an interior of the housing 512. A biasing member 589 may be operatively connected to the cam 587. The biasing member 589 is preferably a coil spring, but may be in any other form, such as a leaf spring, the provides the functionality described herein. The biasing member 589 and the cam 587 may combine to bias the knob 585 and the valve plate 596b into one of the first and second valve positions. In particular, at least a portion of the biasing member 589 engages at least a portion of the cam 587, such as a slot or groove thereof (not shown), and another portion of the biasing member 589 may engage a stationary portion within an interior of the housing 512.

The valve plate 596b is preferably maintained or stationary in either the first valve position or the second valve position unless and until the knob 585 is engaged, depressed and/or rotated. For example, once the valve plate 596b is placed in the second valve position (see FIG. 21B), the kitchen appliance 510 will operate in the pressurized mode until the user decides to change to the non-pressurized mode by engaging the knob 585 and/or the desired amount of a combination of liquid infused by the foodstuff flows into the vessel 515*b* and the HWG 532 is preferably automatically deactivated (e.g., shuts-off) and the pressurized cycle is complete.

Figure 22:
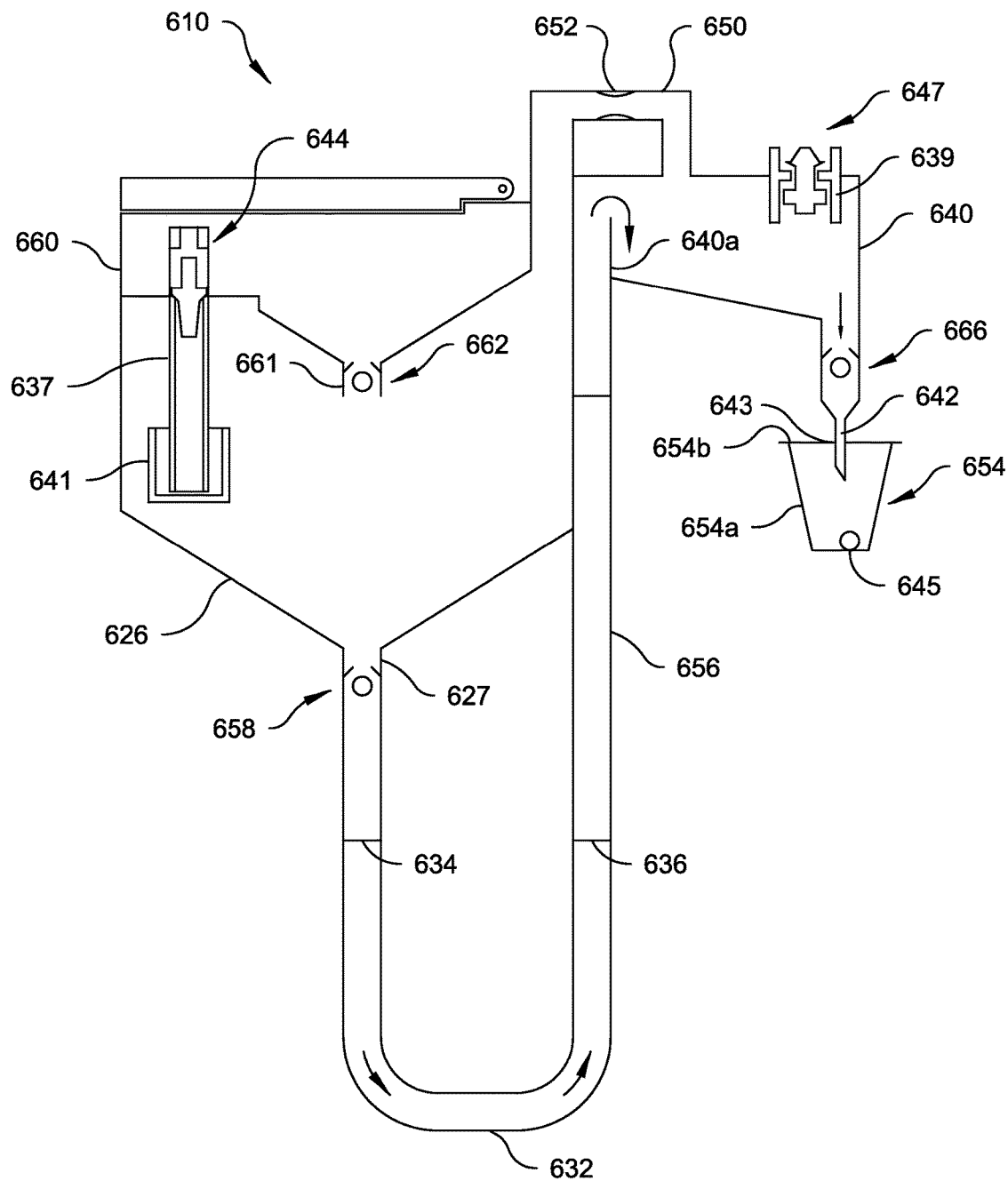
FIG. 22 is a schematic diagram of certain components of the kitchen appliance according another embodiment of the present disclosure.

FIG. 22 illustrates another embodiment of the kitchen appliance 610. The reference numerals of the present embodiment are distinguishable from those of the earlier embodiment by a factor of six-hundred (600), but otherwise indicate the same elements as indicated above, except as otherwise specified. The kitchen appliance 610 of the present embodiment is substantially similar to that of the earlier embodiments. While certain like reference numerals may be shown in FIG. 22, the description of certain similarities between the embodiments may be omitted herein for the sake of brevity and convenience, and, therefore, is not limiting.

A distinguishing feature of the present embodiment is the inclusion of one or more spaced-apart gas (e.g., air) vents or pressure regulating valves 647 positioned at, in or near a wall (such as the top wall) of the second reservoir 640. The gas vent 647 is spaced-apart from the discharge port 642, the conduit 650 and the inlet portion 640*a* of the second reservoir 640. The gas vent 647 may be of a float type, spring-loaded type, gravity type, umbrella type, or the like. The gas vent 647 is movable between an open position (see FIG. 22) to permit the flow of at least some gas therethrough and a closed position to completely or generally prevent or inhibit the flow of gas therethrough. The gas vent 647 is preferably biased open (e.g., downwardly) to allow the flow of at least some gas therethrough. The gas vent 647 may be biased open by gravity (i.e., due to an unequal weight distribution of a portion of a component that forms the gas vent 647) or a vacuum, for example. The gas vent 647 preferably closes (e.g., moves upwardly) under pressure within the second reservoir 640 or via a gas flow rate through the valve.

A skirt 639 extends inwardly from a wall of the second reservoir 640 approximately equal to or at least slightly further than the gas vent 647. The skirt 639 may be positioned in the top wall of the second reservoir 640 and extend downwardly therefrom, or at least a portion of the skirt 639 may be positioned in an angled side wall of the second reservoir 640 and extend at an angle inwardly into the second reservoir 640. At least a portion of the skirt 639 may extend upwardly from the top wall of the second reservoir 640 approximately equal to or at least slightly further than the gas vent 647. The skirt 639 preferably surrounds an entire periphery of the gas vent 647 at least beneath the top wall of the second reservoir 640. An outer and inner sidewall of the skirt 639 may extend perpendicularly to the top wall of the second reservoir 640. Alternatively, at least one of the outer and inner sidewalls of the skirt 639 may extend at an angle or taper with respect to the generally planar top wall of the second reservoir 640. At least a portion of or the entire skirt 639 is laterally spaced-apart from an interior of the sidewalls of the second reservoir 640, which extend generally perpendicularly to the top wall of the second reservoir 640.

In operation, the gas vent 647 preferably remains open or is maintained in at least a partially open state (i.e., allows at least some gas to pass therethrough) unless and until a volume of liquid within the second reservoir 640 is sufficient such that a top level of liquid within the second reservoir 640 reaches and/or contacts a lower end of the skirt 639. At such a point, the fluid dynamics within the skirt change such that the vent closes. Closing the gas vent 647 increases the pressure in the second reservoir 640. As a result of the increased pressure within the second reservoir 640, at least some liquid is forced out of the discharge port 642 and into the container 654. The container 654 otherwise acts as a restriction that impedes or prevents a steady flow of water into the container 654 until the pressure in the second reservoir 640 builds. The above-described pressure increase is preferably only momentary, such that the gas vent 647 reopens shortly thereafter when at least some liquid has been forced out of the discharge port 642 of the second reservoir 640 and the liquid level is reduced.

As a result of the above-described process, the gas vent 647 reduces the total operating pressure of a given cycle, and contributes to forcing liquid out of the discharge port 642 and into the container 654 at an earlier point in time during a given cycle, as compared to at least certain of the earlier embodiments. In other words, the relatively brief closing of the gas vent 647 permits the kitchen appliance 610 to force (i.e., dispense) liquid into the container 654 at an earlier point in the operating cycle. It has been found that inclusion of the skirt 639 helps to close the gas vent 647 more quickly than without the skirt 639. It is preferred that the gas vent 647 is only closed for a relatively short period of time (for example, approximately 1-2 seconds), before the level of liquid within the second reservoir 640 is at least slightly reduced, thereby allowing the gas vent 647 to reopen. The opening and closing of the gas vent 647 is repeated throughout the heating/brewing cycle of the kitchen appliance 610.

Inclusion of the gas vent 647 within the kitchen appliance 610 is beneficial for several reasons, including saturating the contents of the container 654 earlier in the brew cycle, increasing the contact time of coffee and water to thereby produce a stronger brew or beverage. Although the contents of the container 654 are saturated for a longer period of time through use of the gas vent 647, the overall length of the heating/brewing cycle of the kitchen appliance 610 is approximately or even exactly the same as in the earlier embodiments. The closing of the gas vent 647 also allows the kitchen appliance 610 to create smaller and more frequent pressure pulses (e.g., duty cycles), which is less traumatic on the container 654 than less frequent and larger pressure pulses. As a result, the likelihood of inadvertently damaging the container 654, such as undesirably removing or separating at least a portion of the foil top 654*b*, is reduced. The gas vent 647 also allows the second reservoir 640 to be filled with liquid more quickly because any gas within the second reservoir 640 is permitted to exit the second reservoir 640 to allow room for the liquid until the liquid level rises to the bottom of the skirt 639. In addition, because the gas vent 647 is biased open, the second reservoir 640 and other internal reservoirs of the kitchen appliance 610 are able to vent or "dry-out" in between operating cycles.

Another distinguishing feature of the kitchen appliance 610 is a pocket reservoir 641 positioned within the first reservoir 626. The pocket reservoir 641 is employed in combination with the pressure release valve 644, which is positioned in at least one of or between the first reservoir 626 and the third reservoir 660. As described in the earlier embodiments, the pressure release valve 644 is moveable between an open position to permit the flow of at least some fluid therethrough and a closed position (see FIG. 22) to prevent or at least inhibit the flow of fluid therethrough. The pressure release valve 644 is a check valve that is biased in the closed position. The size of the pocket reservoir 641, or the volume of liquid that the pocket reservoir 641 is capable of holding, is less or even significantly less than that of the first reservoir 626.

A channel or fluid passageway 637 extends downwardly from the pressure release valve 644 and into an interior of the pocket reservoir 641. It is preferred that a lower end of the channel 637 extends downwardly a sufficient distance into the interior of the pocket reservoir 641 to come close to, but not contact, an interior surface of a bottom of the pocket reservoir 641. At least a slight or small gap or spacing between the bottom of the channel 637 and the interior surface of the bottom of the pocket reservoir 641 allows fluid to pass therebetween. The channel 637 may be a separate component from the pressure release valve 644, or the channel 637 may be part of the pressure release valve 644 (e.g., integrally formed therewith).

As liquid enters the closed system (i.e., is poured into the first reservoir 626 through the outlet 661 from the third reservoir 660), the pocket reservoir 641 preferably receives and or holds at least some of the liquid. The pocket reservoir 641 may receive liquid once the overall volume of liquid within the first reservoir 626 is sufficiently large such that the top level of the liquid is above the pocket reservoir 641, which results in at least some liquid flowing into the interior of the pocket reservoir 641. Alternatively or additionally, at least a portion of the pocket reservoir 641 may be positioned sufficiently close to the outlet 661 such that at least some of the liquid flowing through the outlet 661 reaches and/or falls into the interior of the pocket reservoir 641, although "refilling" the pocket via the outlet 661 may not be desirable near the end of the brew cycle. In either case, at least a portion of an upper open end of the pocket reservoir 641 is preferably positioned at a height that is below a bottom of the outlet 661 from the third reservoir 660. During at least the initial and intermediate stages of the operating cycle of the kitchen appliance 610, liquid remains in the pocket reservoir 641 even while the liquid is drained from the first reservoir 626 through the HWG 632.

The initial and even intermediate stages of the operating cycle of the kitchen appliance 610 are similar, if not identical, to that described above for the earlier embodiments. However, the pocket reservoir 641 modifies the later stage(s) of the operating cycle of the kitchen appliance 610. In particular, toward or at the end of the operating cycle, the volume of liquid within the first reservoir 626 is relatively low or almost non-existent, the temperature of the HWG 632 is relatively high, and the check valve 662 is closed due to high pressure within the first reservoir 626. At this point, the relatively high pressure seeks equilibrium throughout the closed system and, therefore, flows/moves to the point/area of least resistance.

A point of low resistance within the closed system is the pressure release valve 644. As such, the pressure attempts to escape out of the closed system through the pressure release valve 644. The pressure forces liquid within the pocket reservoir 641 upwardly into the channel 637 to force the pressure release valve 644 open. As a result, liquid previously held in the pocket reservoir 641 flows into the third reservoir 660 and the pressure level within the closed system is reduced. The liquid recently introduced into the third reservoir 660 flows to the outlet 661. As the pressure within the closed system is reduced, the pressure differential between the third reservoir 660 and the first reservoir is such that the check valve 662 will open, and the liquid falls back into the first reservoir 626. At this point, the relatively small amount of liquid in the first reservoir 626 falls or moves into the HWG 632, which is relatively hot. The high temperature of the HWG 632 flashes at least some of the relatively small volume of liquid into gas (e.g., steam), thereby creating a supplemental pressure surge. This surge forces at least some of the gas out of the second reservoir 640 through the discharge port 642 and into the container 654.

A benefit of the above configuration is that the pocket reservoir 641 contributes to the creation of a delayed steam release through the discharge port 642 of the second reservoir 240. This feature at least partially dries or evacuates liquid in the container 654 after the operating cycle is complete, so that the container 654 creates little or no mess when the container 654 is removed from the kitchen appliance 610 to be discarded. In other words, the pocket reservoir 641 contributes to the production of a relatively small and gentle pulse or burst of fluid (e.g., steam) at or near the end of the operating cycle, which contributes to forcing liquid out of the relatively empty or spent container 654 without further puncturing or separating the top seal 654b from the body 654a of the container.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A kitchen appliance comprising:
 a first reservoir for receiving a liquid to be used for preparing a beverage;
 a hot water generator (HWG) having an inlet end, an outlet end and a passageway therebetween, the inlet end of the HWG being connected to the first reservoir, liquid from the first reservoir flowing into the HWG through the inlet end;
 a second reservoir connected to the outlet end of the HWG, the second reservoir including a discharge port, a gas vent and a skirt extending from a wall of the second reservoir further than the gas vent, the skirt at least partially surrounding the gas vent, at least a portion of the skirt being spaced laterally inwardly from an outer sidewall of the second reservoir;
 a third reservoir connected to the first reservoir, liquid within the third reservoir being maintained at atmospheric pressure; and
 a check valve positioned between the first reservoir and the third reservoir, the check valve preventing liquid in the first reservoir from entering the third reservoir from the first reservoir when the check valve is closed.

2. The kitchen appliance according to claim 1, wherein the skirt surrounds an entire periphery of the gas vent.

3. The kitchen appliance according to claim 1, wherein the gas vent is movable between an open position to permit the flow of gas therethrough and a closed position to prevent the flow of gas therethrough, the gas vent being biased in the open position.

4. The kitchen appliance according to claim 3, wherein the gas vent is closed following a sufficient amount of liquid accumulating in the second reservoir.

5. The kitchen appliance according to claim 3, wherein the gas vent is closed shortly after a level of liquid in the second reservoir contacts at least a portion of the skirt.

6. The kitchen appliance according to claim 1, further comprising:
 a fluid path connecting the second reservoir to the first reservoir and bypassing the HWG; and
 a container at least partially enclosing foodstuff for preparing a beverage, the container being in fluid communication with the discharge port of the second reservoir.

7. The kitchen appliance according to claim 1, further comprising:
a pressure release valve positioned between the first reservoir and the third reservoir, the pressure release valve being moveable between an open position to permit the flow of fluid therethrough and a closed position to prevent the flow of fluid therethrough, the pressure release valve being biased in the closed position.

8. The kitchen appliance according to claim 1, wherein the HWG is a U-shaped, tubular, aluminum extrusion with a cal-rod.

\* \* \* \* \*